United States Patent
Guo et al.

(10) Patent No.: US 11,874,480 B2
(45) Date of Patent: Jan. 16, 2024

(54) PLASMONIC LITHOGRAPHY FOR PATTERNING HIGH ASPECT-RATIO NANOSTRUCTURES

(71) Applicant: THE REGENTS OF THE UNIVERSITY OF MICHIGAN, Ann Arbor, MI (US)

(72) Inventors: Lingjie Jay Guo, Ann Arbor, MI (US); Xi Chen, San Jose, CA (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 253 days.

(21) Appl. No.: 16/956,334

(22) PCT Filed: Dec. 20, 2018

(86) PCT No.: PCT/US2018/066869
§ 371 (c)(1),
(2) Date: Jun. 19, 2020

(87) PCT Pub. No.: WO2019/126543
PCT Pub. Date: Jun. 27, 2019

(65) Prior Publication Data
US 2020/0319382 A1  Oct. 8, 2020

Related U.S. Application Data

(60) Provisional application No. 62/608,379, filed on Dec. 20, 2017.

(51) Int. Cl.
*G02B 5/00* (2006.01)
*G02B 1/00* (2006.01)
*G02B 5/18* (2006.01)

(52) U.S. Cl.
CPC .......... *G02B 5/008* (2013.01); *G02B 1/002* (2013.01); *G02B 5/1809* (2013.01)

(58) Field of Classification Search
CPC ........ G02B 5/008; G02B 1/002; G02B 1/007; G02B 26/06; G02B 1/005; G02F 1/292; G02F 2202/30
See application file for complete search history.

(56) References Cited

U.S. PATENT DOCUMENTS 8,995,055 B1  3/2015  Feng
9,069,244 B2  6/2015  Kobrin
(Continued)

FOREIGN PATENT DOCUMENTS

WO    2010120982 A2    10/2010

OTHER PUBLICATIONS

Shekhar, P., Atkinson, J. & Jacob, Z. Hyperbolic metamaterials: fundamentals and applications. Nano Convergence 1, 14 (Year: 2014).*
(Continued)

*Primary Examiner* — Jonathan Y Jung
(74) *Attorney, Agent, or Firm* — Harness, Dickey & Pierce, P.L.C.

(57) ABSTRACT

A plasmonic device incorporating a special hyperbolic metamaterial (HMM) metamaterial is used for plasmonic lithography, including ultraviolet (UV) lithography. It may be a Type II HMM ($\epsilon_\parallel < 0$ and $\epsilon_\perp > 0$) whose tangential component of the permittivity $\epsilon_\parallel$ is close to zero. Due to the high anisotropy of the Type II epsilon near zero (ENZ) HMM, only one plasmonic mode can propagate horizontally with low loss in a waveguide system with ENZ HMM as its core. In certain aspects, a Type II ENZ HMM comprises alternating layers of aluminum/aluminum oxide films and the associated unusual mode of light transmission is used to expose
(Continued)

a photosensitive layer in a specially designed lithography system. Methods for making patterns of nanofeatures via such plasmonic lithography are also provided, including as a plasmonic roller device.

15 Claims, 9 Drawing Sheets

(56) References Cited

U.S. PATENT DOCUMENTS

| | | | |
|---|---|---|---|
| 10,795,168 B2* | 10/2020 | Riley, Jr. | G02B 6/428 |
| 2007/0056680 A1 | 3/2007 | Tan et al. | |
| 2009/0046362 A1 | 2/2009 | Guo et al. | |
| 2009/0256287 A1 | 10/2009 | Fu et al. | |
| 2010/0120982 A1 | 5/2010 | Bossard et al. | |
| 2012/0328240 A1* | 12/2012 | Ma | H01Q 15/0086 |
| | | | 385/33 |
| 2015/0285953 A1* | 10/2015 | Naik | G02B 5/008 |
| | | | 977/761 |
| 2017/0179334 A1* | 6/2017 | Liu | H01L 33/0004 |
| 2021/0200079 A1* | 7/2021 | Luo | G03F 7/70425 |

OTHER PUBLICATIONS

International Search Report and Written Opinion for International Application No. PCT/US2018/066869 dated Mar. 28, 2019 (ISA/US), 8 pages.

Chen, Xi et al., "Large-Area High Aspect Ratio Plasmonic Interference Lithography Utilizing a Single High-k Mode," ACS Nano, 2016 10 (4), pp. 4039-4045; DOI: 10.1021/acsnano.5b06137; Published Online: Apr. 13, 2016.

Chen, Xi et al., "Plasmonic Lithography Utilizing Epsilon Near Zero Hyperbolic Metamaterial," ACS Nano, 2017, 11, pp. 9863-9868; DOI: 10.1021/acsnano.7b03584; Published Online: Oct. 2, 2017.

Javani, Mohammad H., et al., "Real and Imaginary Properties of Epsilon-Near-Zero Materials," Physical Review Letters, 117 (10), 107404; DOI: 10.1103/PhysRevLett.117.107404 (Published: Sep. 2, 2016).

Pina-Hernandez et al., "High-Throughput and Etch-Selective Nanoimprinting and Stamping Based on Fast-Thermal-Curing Poly(dimethylsiloxane)s," Adv. Mater. Comm., 19, pp. 1-7; DOI: 10.1002/adma.200601905 (Published online: Apr. 13, 2007).

Silveirinha, Mário G. et al., "Overview of Theory and Application of Epsilon-Near-Zero Materials," (2008).

Pina-Hernandez, Carlos et al., "High-Resolution Functional Epoxysilsesquioxane-Based Patterning Layers for Large-Area Nanoimprinting," *ACS Nano*, vol. 4, No. 8, 2010, pp. 4776-4784; DOI: 10.1021/nn100478a (Published: Jul. 15, 2010).

Cheng, Xing et al., "Room-Temperature, Low-Pressure, Nanoimprinting Based on Cationic Photopolymerization of Novel Epoxysilicone Monomers," *Advanced Materials* 17 (11) (2005), pp. 1419-1424.

* cited by examiner

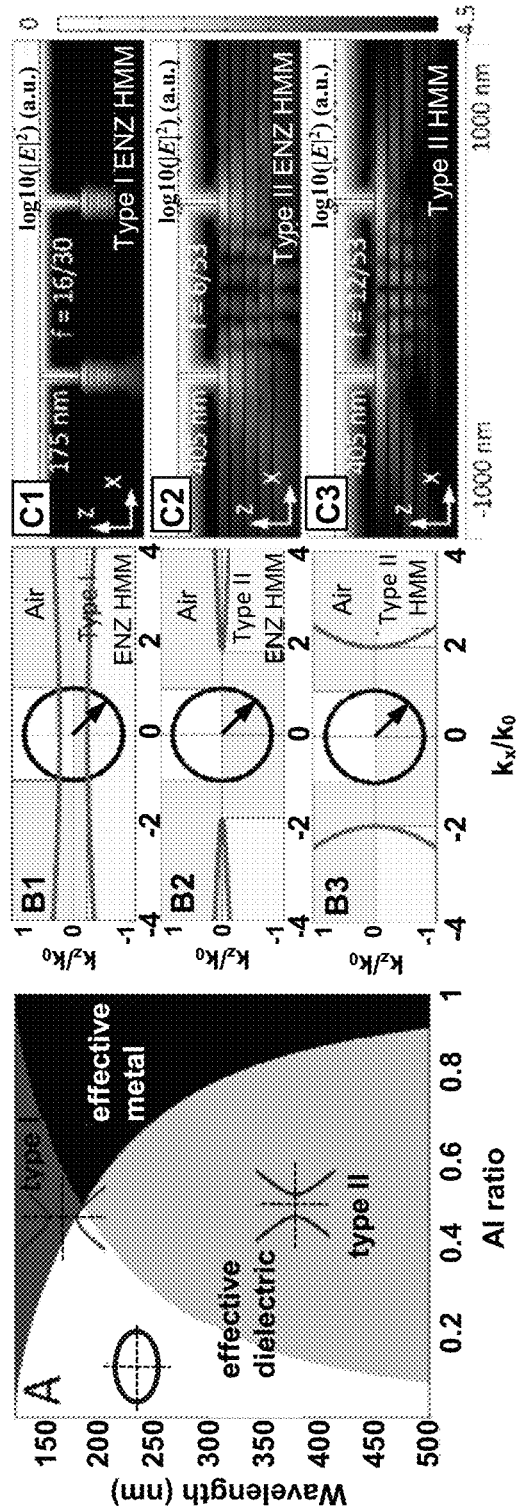
FIGS. 3A–3C(3)

PLASMONIC LITHOGRAPHY FOR PATTERNING HIGH ASPECT-RATIO NANOSTRUCTURES

CROSS-REFERENCE TO RELATED APPLICATIONS

This application is a U.S. National Phase Application under 35 U.S.C. 371 of International Application No. PCT/US2018/066869 filed on Dec. 20, 2018. This application claims the benefit and priority of U.S. Provisional Application No. 62/608,379 filed on Dec. 20, 2017. The entire disclosures of the above applications are incorporated herein by reference.

GOVERNMENT SUPPORT

This invention was made with government support under CMMI-1537440 awarded by the National Science Foundation. The government has certain rights in the invention.

FIELD

The present disclosure relates to new plasmonic methods of patterning nanofeatures onto photosensitive materials by use of plasmonic devices for photolithography, including plasmonic roller devices, which can be used to form microelectronic devices.

BACKGROUND

This section provides background information related to the present disclosure which is not necessarily prior art.

Nanoscale structures can be utilized in a variety of devices for a wide variety of applications, such as optical devices, organic optoelectronics, biosensors, and the like. Several techniques can be used to fabricate nanostructures, like nanograting structures. Current methods for forming such structures suffer from the inability to form high resolution, high aspect ratio, nanoscale features on a large area scale for use in various microelectronic devices. To date, photolithography is still the most widely used patterning technology in the semiconductor industry. However, the resolution of photolithography is restricted by light diffraction ($\Delta \sim \lambda/NA$), where $\lambda$ is the wavelength of the exposure light and NA is the numerical aperture of the projection system.

Hyperbolic metamaterials (HMMs) can improve the resolution of features formed during lithography, which are described by an effective electric permittivity in the tensor form:

$$\bar{\epsilon} = \begin{pmatrix} \epsilon_{xx} & 0 & 0 \\ 0 & \epsilon_{yy} & 0 \\ 0 & 0 & \epsilon_{zz} \end{pmatrix}$$

with only principal components. The sign of the tangential permittivity of HMMs is the same $\epsilon_{11} = \epsilon_{xx} = \epsilon_{yy}$, but the signs of its tangential and vertical permittivity are opposite $\epsilon_\parallel \cdot \epsilon_\perp = \epsilon_{xx} \cdot \epsilon_{zz} < 0$, where both $\epsilon_\parallel$ and $\epsilon_\perp$ are complex values. HMMs have been widely exploited for various purposes, for example, as a hyperlens in imaging and filters in ultraviolet (UV) lithography. Using the hyperlens, patterns can be replicated with the same size as that of the mask by flat structures. While a curved hyperlens can produce patterns smaller than the mask, the 1:1 patterning approach is challenging because the mask should be exactly the same as the patterns in fabrication and thus can limit the size of the features formed. Other approaches use HMMs as filters to produce patterns based on interference effect. However, due to the strong attenuation of the light propagating in the HMMs, the field intensity in the light-sensitive photosensitive or photoresist (PR) layer is several orders of magnitude weaker than that of the incident light. These two characteristics have seriously restricted the practicality of a nanolithography system based on HMMs.

To overcome these issues, a plasmonic lithography system which can create high resolution interference patterns, while maintaining high light transmission would be desirable. The teachings of the present disclosure provide devices that can create microscale and nanoscale features in subwavelength patterns on a surface of a substrate that have high resolution, high-aspect ratios and high fidelity to a mold pattern, overcoming shortcomings associated with conventional lithography and HMM interference patterning.

SUMMARY

This section provides a general summary of the disclosure, and is not a comprehensive disclosure of its full scope or all of its features.

In various aspects, a plasmonic device for lithography is provided. The device comprises an optical epsilon-near-zero (ENZ) metamaterial structure having an effective in-plane permittivity of approximately 0.

In one aspect, the optical epsilon-near-zero (ENZ) metamaterial is an epsilon-near-zero (ENZ) hyperbolic metamaterial (HMM).

In one aspect, the epsilon-near-zero (ENZ) hyperbolic metamaterial (HMM) is a Type II epsilon-near-zero (ENZ) hyperbolic metamaterial (HMM) that generates a single plasmonic mode.

In a further aspect, the epsilon-near-zero (ENZ) hyperbolic metamaterial (HMM) comprises a stack comprising at least one metal layer and at least one dielectric layer.

In a further aspect, the at least one metal layer comprises a metal selected from the group consisting of: aluminum (Al), gold (Au), copper (Cu), silver (Ag), combinations and alloys thereof and the at least one dielectric layer comprises a dielectric material selected from the group consisting of: aluminum oxide ($Al_2O_3$), silicon dioxide ($SiO_2$), silicon nitride ($Si_3N_4$), zinc selenide (ZnSe), zinc oxide (ZnO), zirconium oxide ($ZrO_2$), titanium oxide ($TiO_2$), tantalum pentoxide ($Ta_2O_5$), dielectric polymers, and combinations thereof.

In a further aspect, at least one metal layer has a thickness of greater than or equal to about 3 nm to less than or equal to about 15 nm and the at least one dielectric layer has a thickness of a thickness of greater than or equal to about 35 nm to less than or equal to about 55 nm.

In a further aspect, the stack comprises a total of greater than or equal to about 7 layers of alternating metal layers and dielectric material layers.

In one aspect, the device further comprises a photomask having a grating structure comprising a plurality of metallic rows spaced apart from one another to define a plurality of openings through which electromagnetic radiation passes.

In a further aspect, a period of the photomask is greater than or equal to about 695 nm to less than or equal to about 702 nm.

In a further aspect, the device further comprises a photoresist material to be patterned by electromagnetic radiation that is disposed between the optical epsilon-near-zero (ENZ) metamaterial structure and a multilayered stack that comprises at least one second metal layer and at least one second dielectric material layer. An index matching layer is disposed in open regions of the photomask, where the photomask is disposed adjacent to a first side of the optical epsilon-near-zero (ENZ) metamaterial structure and the photoresist material is disposed adjacent to a second side of the optical epsilon-near-zero (ENZ) metamaterial opposite to the first side.

A lithography system that comprises such a plasmonic device is also contemplated, where the optical epsilon-near-zero (ENZ) metamaterial structure is wrapped around a cylindrical component that transmits electromagnetic radiation having a predetermined wavelength. Such a lithography system is capable of continuously producing a nanofeature in a photosensitive material.

In various other aspects, a method for plasmonic lithography is provided that comprises passing electromagnetic radiation having a predetermined wavelength into a plasmonic device that comprises a photomask having a plurality of openings and an optical epsilon-near-zero (ENZ) metamaterial structure having an effective in-plane permittivity of approximately 0. The electromagnetic radiation generates a single plasmonic mode inside the optical epsilon-near-zero (ENZ) metamaterial structure and then passes to a photosensitive material disposed beneath the plasmonic device to form a pattern comprising a nanofeature in the photosensitive material. The nanofeature has at least dimension that is less than ⅓ of the predetermined wavelength.

In one aspect, the plasmonic device is in the form of a roller and the optical epsilon-near-zero (ENZ) metamaterial structure is wrapped around a cylindrical component that transmits the electromagnetic radiation having the predetermined wavelength, wherein the passing occurs continuously to form the pattern.

In one further aspect, the roller contacts the photosensitive material during the passing.

In one aspect, the nanofeature has at least dimension that is less than ⅙ of the predetermined wavelength.

In one aspect, an average field intensity of light that reaches the photosensitive material is greater than or equal to about one half of the incident light.

The method of claim 11, wherein the nanofeature has an aspect ratio of greater than or equal to about 2:1.

In one aspect, the pattern comprises a plurality of nanofeatures and the plurality of nanofeatures formed is substantially uniform so that a first dimension of a first nanofeature deviates less than 30% from a second dimension of a second nanofeature.

In one aspect, the predetermined wavelength is greater than or equal to about 10 nm to less than or equal to about 750 nm.

In one aspect, the optical epsilon-near-zero (ENZ) metamaterial structure is an epsilon-near-zero (ENZ) hyperbolic metamaterial (HMM) is a Type II epsilon-near-zero (ENZ) hyperbolic metamaterial (HMM) that generates the single plasmonic mode.

In one aspect, the epsilon-near-zero (ENZ) hyperbolic metamaterial (HMM) comprises a stack comprising at least one metal layer and at least one dielectric layer.

In one further aspect, the at least one metal layer comprises a metal selected from the group consisting of: aluminum (Al), gold (Au), copper (Cu), silver (Ag), combinations and alloys thereof and the at least one dielectric layer comprises a dielectric material selected from the group consisting of: aluminum oxide ($Al_2O_3$), silicon dioxide ($SiO_2$), silicon nitride ($Si_3N_4$), zinc selenide (ZnSe), zinc oxide (ZnO), zirconium oxide ($ZrO_2$), titanium oxide ($TiO_2$), tantalum pentoxide ($Ta_2O_5$), dielectric polymers, and combinations thereof.

In certain other variations, the present disclosure contemplates a lithography system comprising a plasmonic roller device for lithography that comprises a grating structure having a plurality of openings and a plasmonic lens. The plasmonic lens may include a stack comprising at least one metal layer and at least one dielectric layer. The lithography system includes a source of electromagnetic radiation having a predetermined wavelength that is directed into the plasmonic roller device. The lithography system also includes a movable substrate on which a photosensitive material is disposed. The plasmonic roller device is capable of forming a pattern comprising a nanofeature having at least one dimension that is less than ⅓ of the predetermined wavelength in the photosensitive material.

In one aspect, the plasmonic lens comprises an optical epsilon-near-zero (ENZ) metamaterial structure having an effective in-plane permittivity of approximately 0.

In one aspect, the optical epsilon-near-zero (ENZ) metamaterial is an epsilon-near-zero (ENZ) hyperbolic metamaterial (HMM).

In one aspect, the epsilon-near-zero (ENZ) hyperbolic metamaterial (HMM) is a Type II epsilon-near-zero (ENZ) hyperbolic metamaterial (HMM) that generates a single plasmonic mode.

In one aspect, the at least one metal layer comprises a metal selected from the group consisting of: aluminum (Al), gold (Au), copper (Cu), silver (Ag), combinations and alloys thereof and the at least one dielectric layer comprises a dielectric material selected from the group consisting of: aluminum oxide ($Al_2O_3$), silicon dioxide ($SiO_2$), silicon nitride ($Si_3N_4$), zinc selenide (ZnSe), zinc oxide (ZnO), zirconium oxide ($ZrO_2$), titanium oxide ($TiO_2$), tantalum pentoxide ($Ta_2O_5$), dielectric polymers, and combinations thereof.

In one aspect, the at least one metal layer has a thickness of greater than or equal to about 3 nm to less than or equal to about 15 nm and the at least one dielectric layer has a thickness of greater than or equal to about 35 nm to less than or equal to about 55 nm.

In one aspect, the stack comprises a total of greater than or equal to about 7 layers of alternating metal layers and dielectric material layers.

In one aspect, the plasmonic roller device further comprises a cylinder. The grating structure and the plasmonic lens are wrapped over the cylinder. The cylinder is capable of transmitting the electromagnetic radiation having the predetermined wavelength.

In one aspect, the lithography system further comprises an elastomeric layer disposed on an external surface of the cylinder and over which the grating structure and the plasmonic lens are wrapped.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 3A-3C(3) are illustrations of how different types of HMM can be applied in lithography. FIG. 3A shows characteristics of an HMM stack including Al and $Al_2O_3$ layers as a function of wavelength and fill ratio of aluminum as well as the dispersion relations at different regimes. FIGS. 3B(1)-3B(3) show the iso-frequency curve of air (black circle) and the HMM (magenta hyperbola). FIGS. 3C(1)-3C(3) show the corresponding electric field distribution log $10(|E|^2)$ in HMM when TM polarized light is incident from air onto two nanoslits right above the HMM: B(1) is a Type I ENZ at the wavelength of 175 nm with fill ratio of f=16/30 and corresponding C(1) shows propagating modes in an $Al/Al_2O_3$ HMM stack made of 7 layers of 16 nm Al and 14 nm $Al_2O_3$ films; B(2) and B(3) show Type II ENZ HMM at the wavelength of 405 nm with fill ratios of B(2) f=6/53 and B(3) f=12/53, and the corresponding interference pattern formed in the HMM made of C(2) 7 layers of 6 nm Al and 47 nm $Al_2O_3$ films and C(3) 7 layers of 12 nm Al and 41 nm $Al_2O_3$. A much stronger field at the bottom photoresist layer is observed in the case of Type II ENZ HMM.

Figures 4A, 4B:
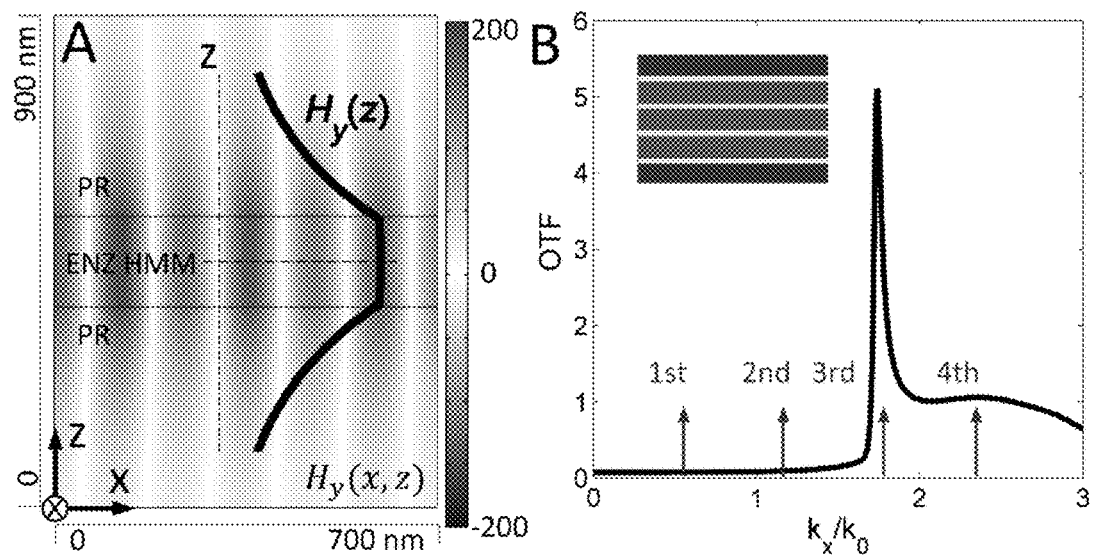

FIGS. 4A-4B. FIG. 4A shows magnetic field distributions $H_y(x, z)$ in the xz plane (color) and $H_y(z)$ along the z axis (black curve) of distribution of the mode in the waveguide with Al-based Type II ENZ metamaterial as core and PR as claddings. The thickness of the core is 165 nm. FIG. 4B shows transmitted intensity $|H_t/H_i|^2$ of 7 alternating layers of 6 nm Al and 47 nm $Al_2O_3$ with the TM light illumination at 405 nm wavelength, where the $H_t$ is the transmitted magnetic field and $H_i$ is the incident magnetic field. The diffraction orders of the 700 nm grating are marked by the red arrows.

Figures 5A, 5B, 5C:
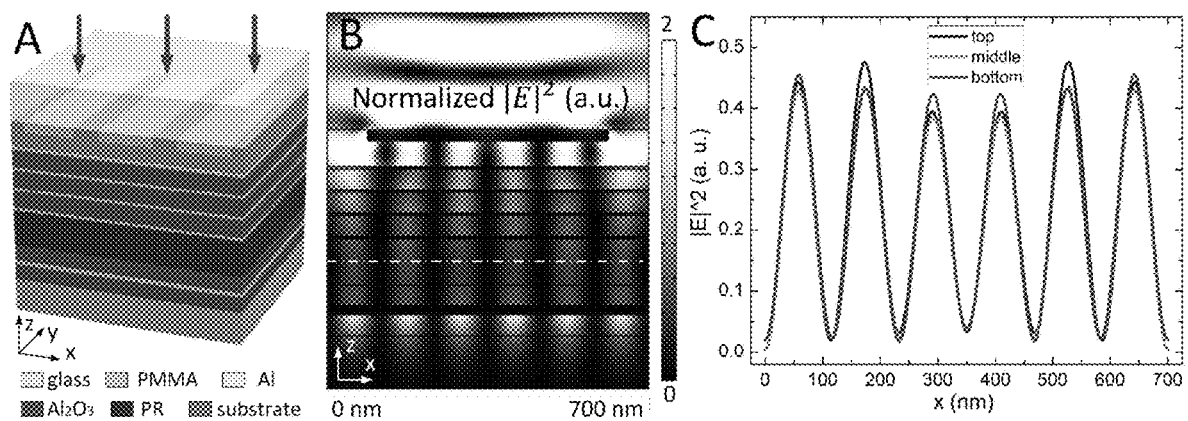

FIGS. 5A-5C. FIG. 5A shows a schematic of the ENZ lithography design in Cartesian coordinates. FIG. 5B shows a normalized $|E|^2$ distribution in the xz plane with the wavelength illumination for 7 layers of 6 nm Al and 47 nm $Al_2O_3$ ENZ HMM, and the white dashed line indicates the middle position in the PR. FIG. 5C shows a normalized electric field distribution $|E|^2$ along horizontal dashed lines at the top, middle, and bottom positions in the photoresist material layer.

Figures 6A, 6B, 6C, 6D, 6E, 6F, 6G, 6H, 6I, 6J:
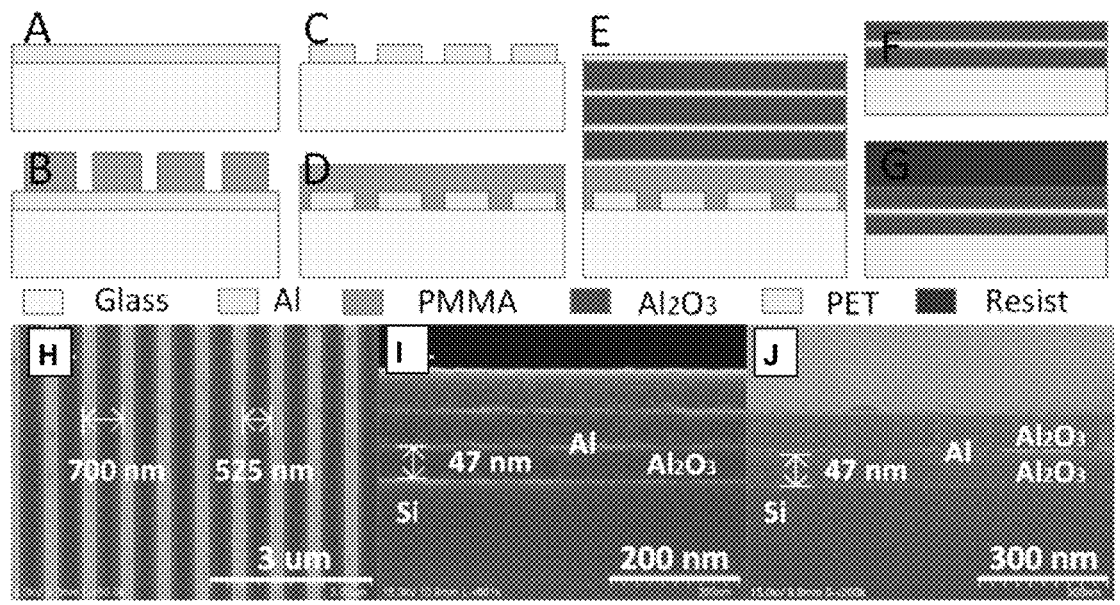

FIGS. 6A-6J. FIGS. 6A-6E illustrate a fabrication process to form masks on a transparent glass substrate. FIGS. 6F-6G show SU-8 photoresist on a planarized PET flexible substrate. FIG. 6A shows a layer of aluminum sputtered on a glass substrate. FIG. 6B shows a polymer (PMMA) on the aluminum, where the polymer is patterned after electron beam lithography etching. FIG. 6C shows aluminum grating after reactive ion etching (RIE). FIG. 6D shows a PMMA coating applied over the aluminum grating after planarization. FIG. 6E shows e-beam evaporation to form alternating layers of $Al/Al_2O_3$ to create a multilayer film stack. FIG. 6F shows $Al_2O_3$—Al—$Al_2O_3$ films sputtered on a planarized PET substrate having SU-8 applied thereto. FIG. 6G shows a photoresist (PR) applied by spin-coating over the multilayer stack film. FIGS. 6H, 6I, and 6J are corresponding SEM images of the processes from FIGS. 6C, 6E, and 6F respectively. FIG. 6H is a top view of the Al grating on glass substrate. FIG. 6I is a cross-sectional view of the multilayer structure deposited on Si wafer. FIG. 6J is a cross-sectional view of the Al and $Al_2O_3$ films deposited on Si wafer made by e-beam evaporation.

Figures 7A, 7B, 7C:
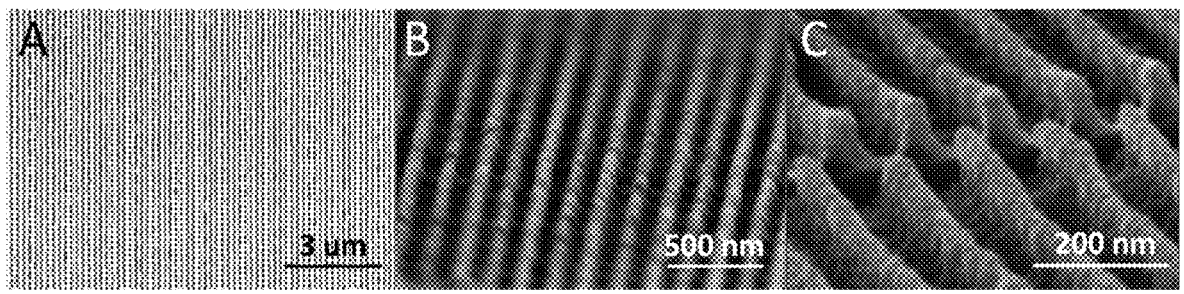

FIGS. 7A-7C. FIGS. 7A-7C illustrate SEM images of the patterns made on a photoresist material by a device assembly according to certain aspects of the present disclosure that includes a photomask and lens formed of an optical metamaterial structure in the form of an epsilon-near-zero (ENZ) hyperbolic metamaterial (HMM) (formed of $Al/Al_2O_3$ layered ENZ metamaterials). FIG. 7A shows a top view of the pattern (scale bar 3 μm), FIG. 7B shows an angled view of the pattern (scale bar 500 nm), and FIG. 7C shows a cross-sectional view of the pattern having a period around 117 nm (scale bar 200 nm).

Figures 8A, 8B, 8C, 8D:
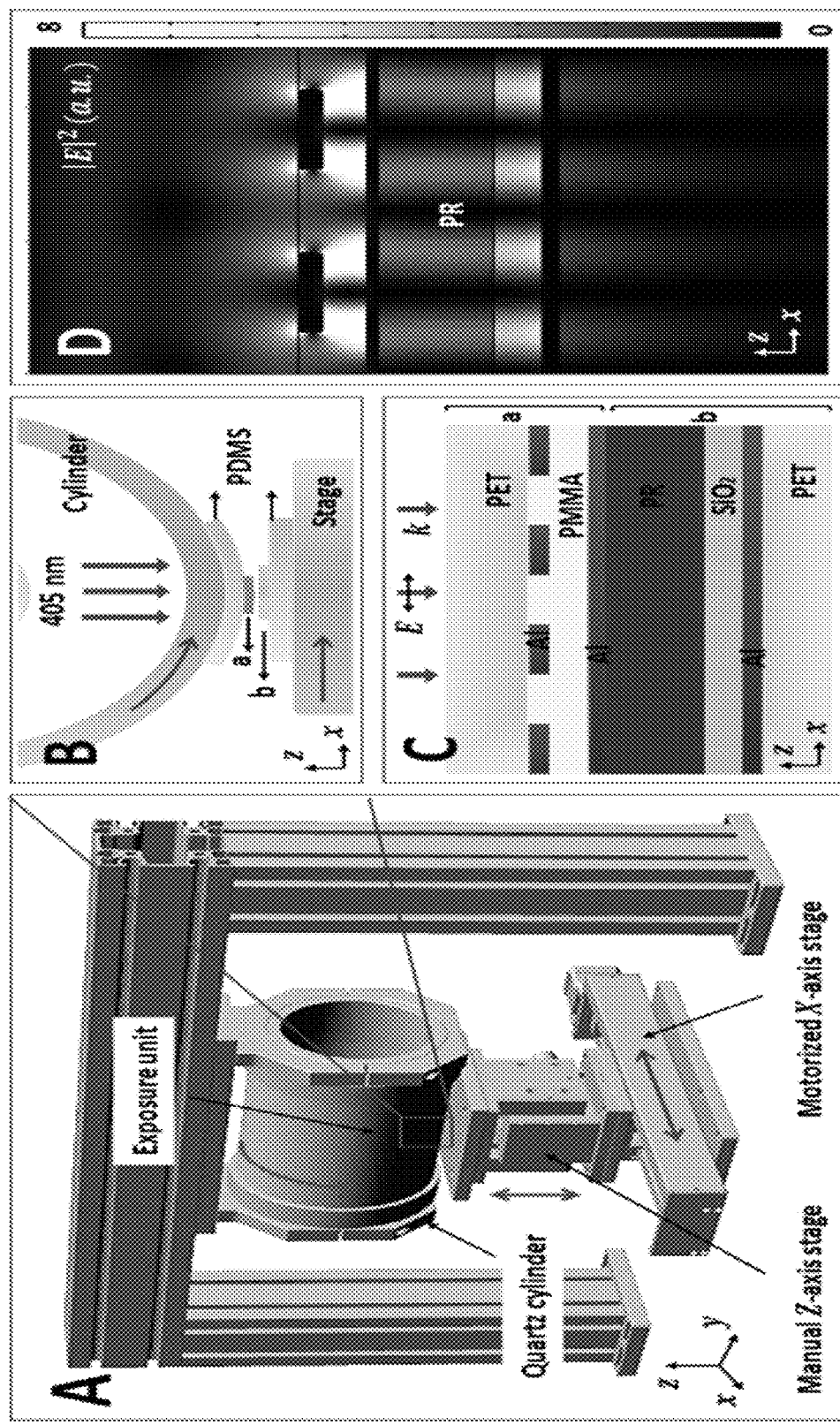

FIGS. 8A-8D show an exemplary plasmonic roller system for lithography. FIG. 8A is a schematic of one variation of a plasmonic roller system prepared in accordance with certain aspects of the present disclosure. FIG. 8B is a cross sectional view of the cylinder and stage while moving. FIG. 8C is a cross-sectional detailed view of the plasmonic lithography system in FIG. 8B, including a plasmonic roller device (the photomask shown as (a)) and a photosensitive/photoresist (PR) film on a flexible polyethylene terephthalate (PET) substrate (shows as (b)) illuminated by TM polarized laser beam. FIG. 8D shows normalized electric field distribution $|E|^2$ when the photomask and substrate are in contact. Periodic distributions in the PR layer with enhanced light intensity by plasmonic effects are shown.

Figures 9A, 9B, 9C, 9D, 9E, 9F, 9G, 9H:
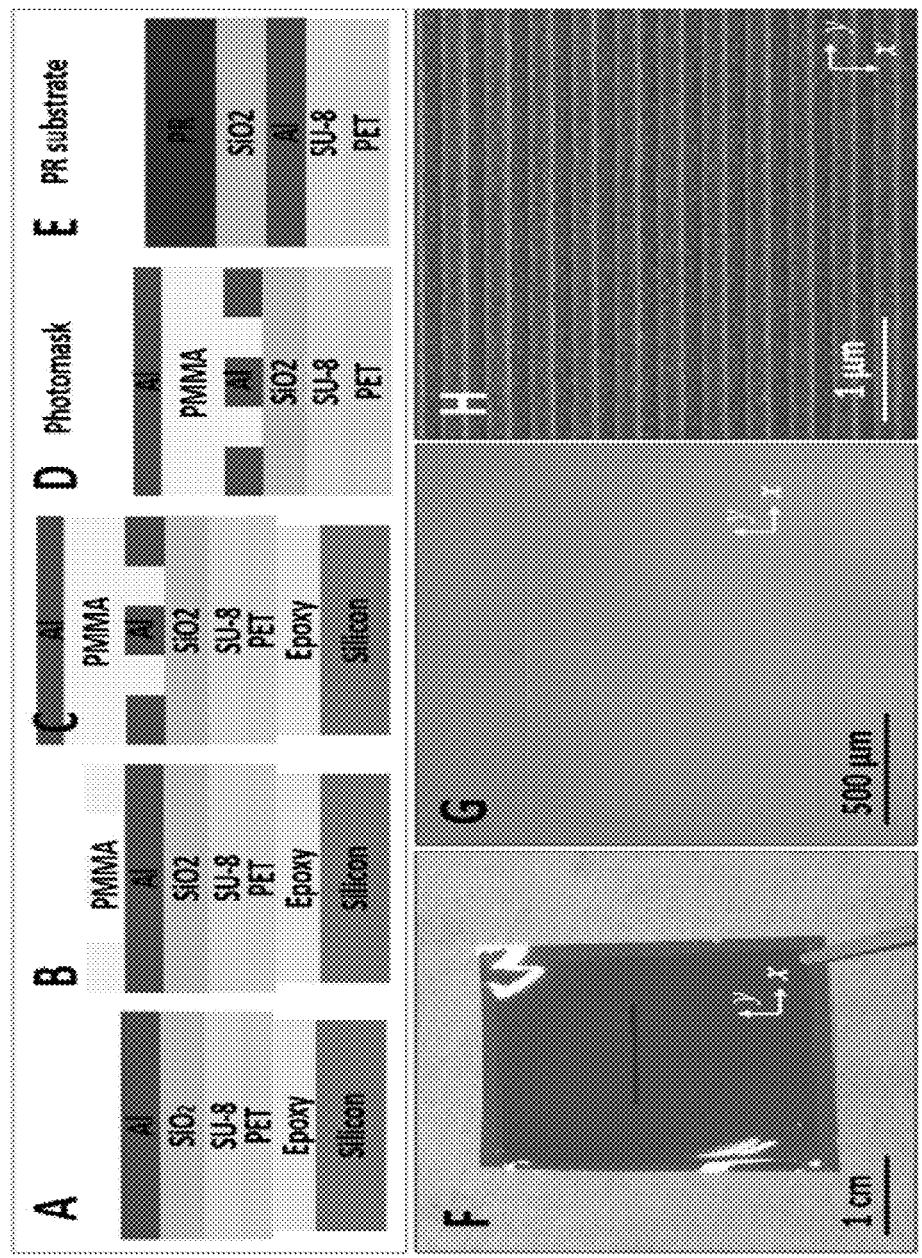

FIGS. 9A-9H show fabrication of a flexible photomask and a photosensitive/photoresist (PR) substrate in accordance with certain aspects of the present disclosure. FIG. 9A shows deposition of an aluminum (Al) layer on a planarized polyethylene terephthalate (PET) film glued on a silicon (Si) piece with an epoxy-based glue. Multiple layers are used to make the PET substrate flat and smooth. FIG. 9B shows an electron beam lithography (EBL) process to fabricate the polymethylmethacrylate (PMMA) pattern. FIG. 9C shows a process for fabricating a grating structure by reactive-ion etching (RIE) to form metal gratings comprising aluminum, spin coating of the PMMA spacer and deposition of an additional metal (Al) layer. FIG. 9D shows removal of the PET substrate having the grating structure from the silicon (Si) wafer substrate. FIG. 9E shows a schematic of the photosensitive/photoresist (PR) layer having other stacks on another PET substrate. FIG. 9F shows a photograph of the photomask with a size of 1.5 cm×500 μm. FIG. 9G shows a plasmonic photomask with a size of 1 mm×2 mm under an optical microscope. FIG. 9H shows an SEM image of a periodic Al grating with a period of 245 nm and 50% duty cycle. The grating line is along the y-axis.

Figures 10A, 10B:
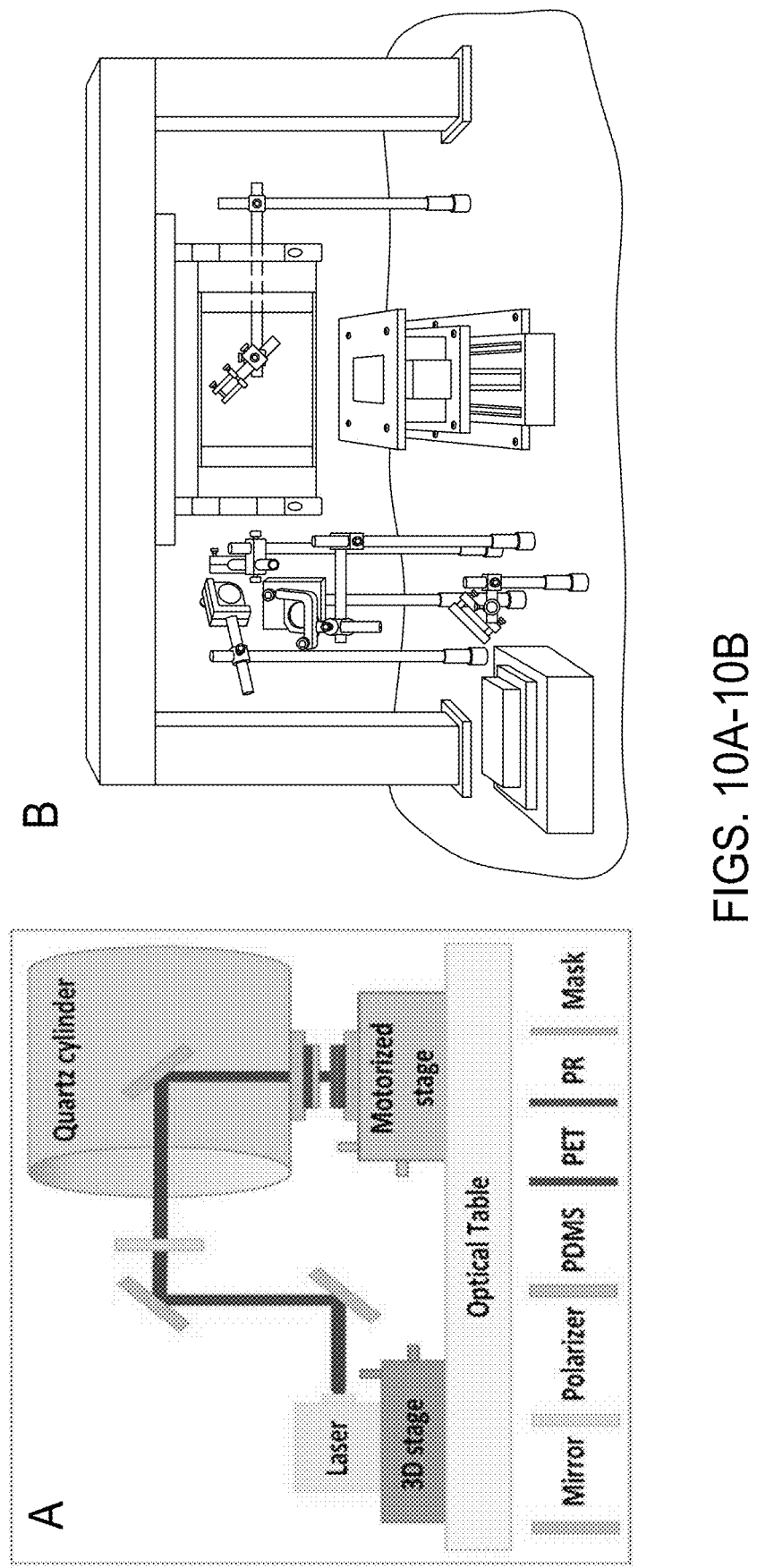

FIGS. 10A-10B show a plasmonic lithography system prepared in accordance with certain aspects of the present disclosure, including an optical setup of the plasmonic roller system. FIG. 10A is a schematic of the plasmonic roller system including a transparent quartz cylinder and stages. FIG. 10B shows a photograph of the plasmonic lithography system setup.

Figures 11A, 11B, 11C, 11D:
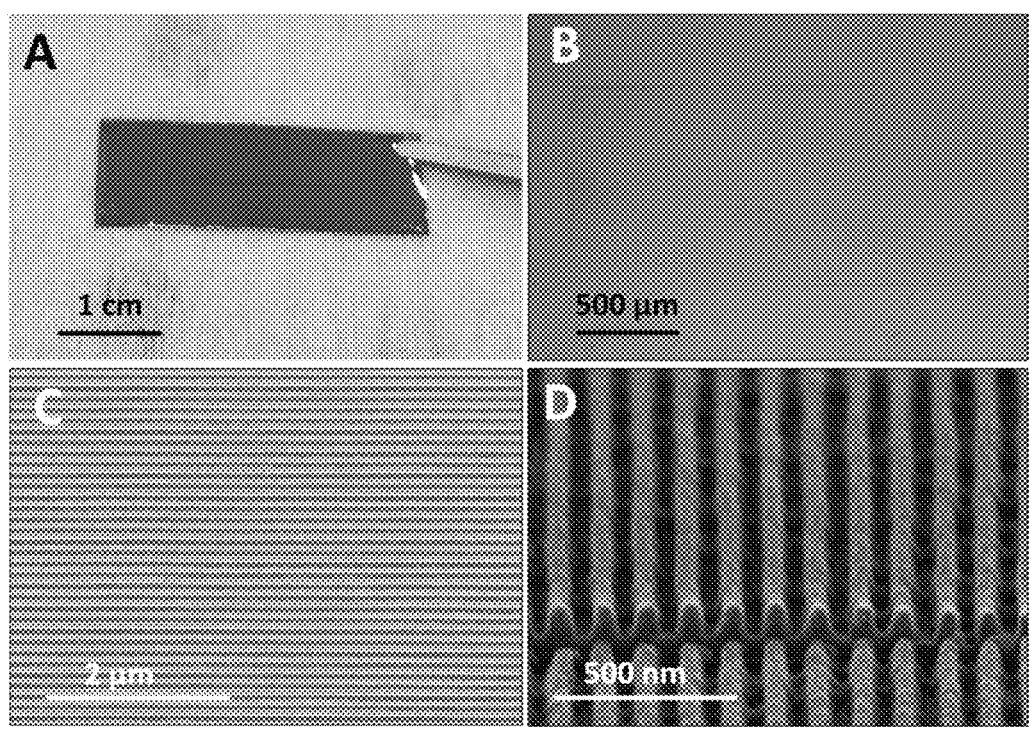

FIGS. 11A-11D show results of exposure of the PR patterns on PET substrates to the plasmonic roller devices prepared in accordance with certain aspects of the present disclosure. FIG. 11A shows a photo of the photoresist (PR) pattern after exposure, development and metal coating. FIG. 11B shows a microscopic photo of the photoresist before metal coating. FIG. 11C shows a top view SEM images of the periodic patterns on PR with a period of 122.5 nm. FIG. 11D shows a cross-sectional view of the PR patterns with a thickness of 100 nm.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure contemplates a plasmonic device for lithography that may include an optical metamaterial structure having an effective in-plane permittivity (an effective electric permittivity ($\epsilon$)) of approximately 0. By approximately 0, it is meant that the relative permittivity ($\epsilon$) is less than or equal to about $|Re(\epsilon_{xx})|<0.01$, optionally less than or equal to about $|Re(\epsilon_{xx})|<0.1$, and in certain variations, optionally less than or equal to about $|Re(\epsilon_{xx})|<0.75$. By in-plane it is meant that permittivity is measured in a planar direction of the optical metamaterial in a direction generally perpendicular to incoming electromagnetic light/radiation. Such an optical metamaterial may be an epsilon-near-zero (ENZ) hyperbolic metamaterial (HMM) capable of producing subwavelength patterns in a photosensitive material to be patterned via plasmonic lithography. For example, a special type of ENZ HMM metamaterial, whose tangential component of permittivity almost reaches zero $\epsilon_{xx} \to 0$ is particularly suitable in accordance with certain aspects of the present invention. In certain variations, the ENZ HMM metamaterial comprises a stack of at least one metal film or layer and at least one dielectric film or layer. The stack may include alternating metal and dielectric films or layers, providing a planar structure necessary for constructing a plasmonic lithography system. In certain aspects, the stack includes a plurality of metal layers and a plurality of the dielectric layer. The effective permittivity of the stacked structure can be calculated by the effective medium theory as $\epsilon_{xx} = \epsilon_{yy} = f\epsilon_m + (1-f)\epsilon_d$ and $\epsilon_{xx} = \epsilon_m \epsilon_d / [(1-f)\epsilon_m + f\epsilon_d]$, where f stands for the fill ratio of the metal $f = t_m/(t_m + t_d)$, and $\epsilon_m$ ($\epsilon_d$) is the relative permittivity for the metal (dielectric), and $t_m$ ($t_d$) are their thicknesses.

Figure 1:
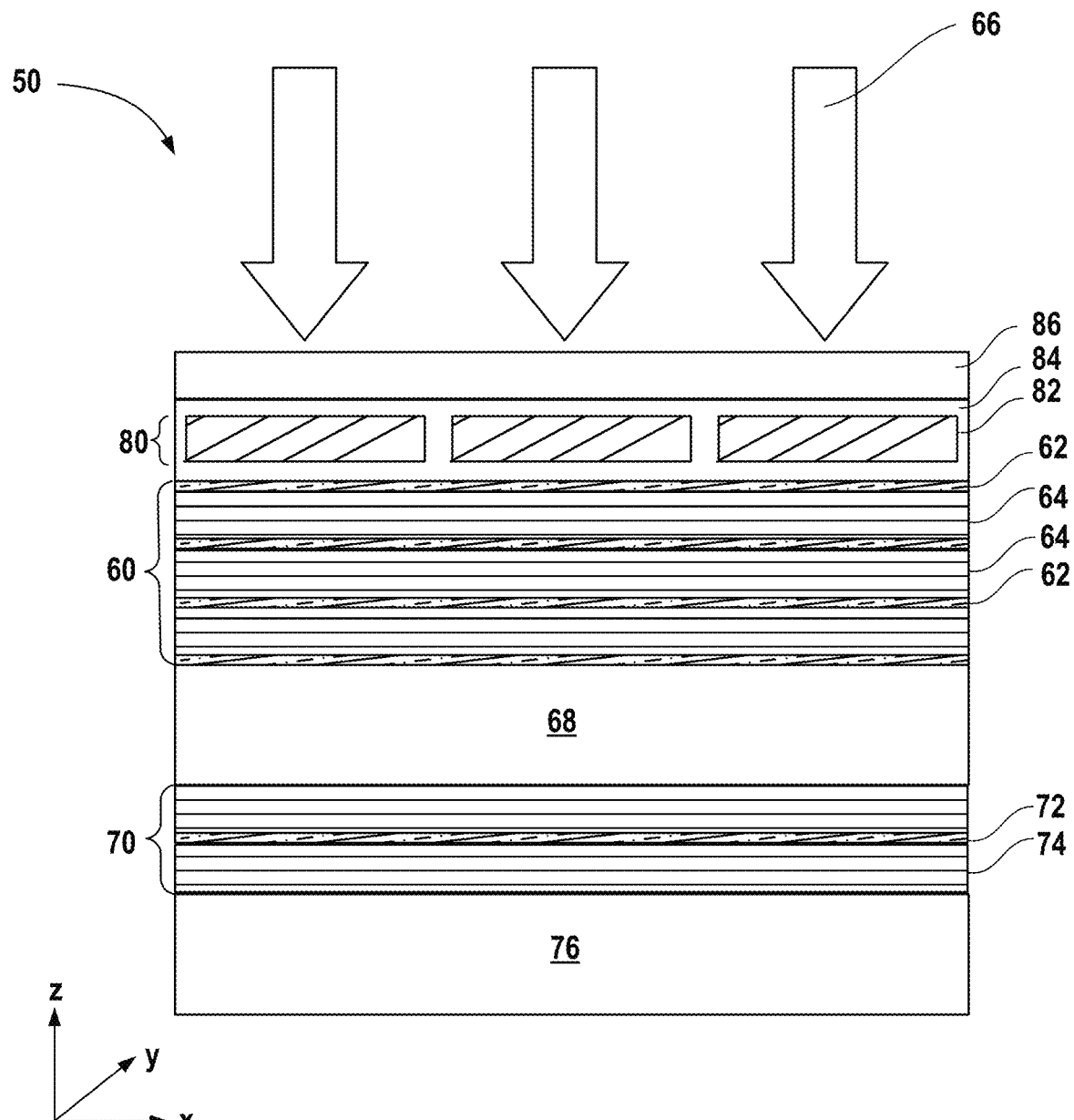
FIG. 1 is a schematic of an exemplary device assembly according to certain aspects of the present disclosure that includes a photomask and lens formed of an optical metamaterial structure in the form of an epsilon-near-zero (ENZ) hyperbolic metamaterial (HMM).

FIG. 1 shows an exemplary device 50 for use with plasmonic lithography to pattern a photosensitive material that includes an optical metamaterial structure. More specifically, the optical metamaterial in device 50 is an epsilon-near-zero (ENZ) hyperbolic metamaterial (HMM) 60. The ENZ HMM 60 is a stack of alternating metal layers 62 and dielectric material layers 64 that can serve as a lens for transmitting electromagnetic radiation within the device. The metal layers 62 serve as plasmonic material in the ENZ HMM 60 stack, while the dielectric material layers 64 provide the desired metamaterial in-plane permittivity properties. While not limiting, as shown, the ENZ HMM 60 stack includes seven (7) total layers, including four (4) metal layers 62 and three (3) dielectric material layers 64. The number of layers, thickness of layers, and composition of each respective layer are selected to create the ENZ HMM 60 having an effective in-plane permittivity of approximately 0. Notably the number, composition, and thickness of each respective layer (either metal layers 62 or dielectric material layers 64) selected depends on the wavelength or range of wavelengths of electromagnetic radiation or light 66 to be transmitted through the ENZ HMM 60 stack to a photosensitive or photoresist material 68 to be patterned by the transmitted light.

Electromagnetic light waves of interest may include ultraviolet light (UV) having wavelengths ranging from about 10 nm to about 390 nm, which includes deep ultraviolet light (DUV) having wavelengths of greater than 10 nm to less than about 250 nm and visible light having wavelengths ranging from about 390 to about 750 nm. Other electromagnetic light waves include i-line lithography referring to a wavelength of 365 nm and h-line referring to a wavelength of 405 nm.

Generally, a greater number of layers in the ENZ HMM 60 stack provide a plasmonic device having more uniformity in the features ultimately formed within the photoresist material 68; however, a greater number of layers also has a tradeoff in that an intensity of the light 66 transmitted to the photoresist material 68 to be patterned is reduced.

Similarly, a thicker metal layer 62 provides more uniform features with fewer potential defects in the nanostructures formed, but again can reduce an intensity of light 66 that reaches the photoresist material 68. Stated in another way, if a thickness of the metal layer 62 is too thin, patterns formed in the photoresist material 68 are not uniform, but if the thickness is too great, the intensity of light transmitted undesirably weakens. In certain aspects, a thickness of the metal layer 62 may range from greater than or equal to about 3 nm to less than or equal to about 15 nm, optionally greater than or equal to about 5 nm to less than or equal to about 11 nm. In one variation, the thickness may be about 6 nm to 7 nm. Selection of the metal composition again depends on the range of wavelengths of light 66 to be transmitted within the device 50 to the photoresist material 68. In certain variations, the metal layer 62 comprises a metal selected from the group consisting of: aluminum (Al), gold (Au), copper (Cu), silver (Ag), combinations and alloys thereof. For example, for longer wavelengths of light (e.g., above about 500 nm), gold (Au), copper (Cu), or alloys thereof can be selected. For mid-range wavelengths of light 66, for example, ranging from greater than or equal to about 350 nm to less than or equal to about 480 nm, including broadband UV-lithography mercury lamp generated i-line light (a wavelength of 365 nm), h-line at 405 nm, and g-line light at 436 nm, a suitable metal may be silver (Ag) or alloys thereof. For shorter wavelengths of light 66, for example, less than about 350 nm, the metal may comprise aluminum (Al) or aluminum alloys, like aluminum (Al) and silver (Ag) alloys.

In other aspects, a thickness of the dielectric material layer 64 may range from greater than or equal to about 35 nm to less than or equal to about 55 nm, optionally greater than or equal to about 45 nm to less than or equal to about 50 nm. In one variation, the thickness may be about 47 nm. Selection of the dielectric material composition again depends on the range of wavelengths of light 66 to be transmitted within the device 50 and depends on the effective permittivity of the dielectric material and desired metamaterial design. In certain variations, the dielectric material may be aluminum oxide ($Al_2O_3$), silicon dioxide ($SiO_2$), silicon nitride ($Si_3N_4$), zinc selenide (ZnSe), zinc oxide (ZnO), zirconium oxide ($ZrO_2$), titanium oxide ($TiO_2$), tantalum pentoxide ($Ta_2O_5$), or various polymers that have dielectric properties that are known in the art. In one variation, the ENZ HMM 60 stack has at least one metal layer 62 that comprises aluminum or an alloy of aluminum and the dielectric material layer 64 comprises aluminum oxide ($Al_2O_3$). Further aspects of the ENZ MINI 60 assembly will be discussed below.

The photoresist material 68 may be a radiation curable photoresist material disposed on a substrate, such as any conventional photosensitive/photoresist material that cures or is otherwise reactive to exposure to electromagnetic radiation, including negative and positive photoresist materials. With positive resist materials, the areas exposed to radiation at certain levels become soluble in developer, while with negative resists the exposed areas are cross-linked and become insoluble. Suitable photosensitive photoresist materials include by way of non-limiting example all g-line and i-line photoresists (responsive to spectral lines at about 436 nm ("g-line") and 365 nm ("i-line"), as well as resists for shorter wavelength exposure light sources. The liquid photoresist material 68 may be applied to a surface of a substrate by a process selected from spin casting, spin coating, ink jetting, spraying, and/or by gravure application methods, by way of example. In certain variations, the solidified photoresist material 68 may have a thickness of greater than or equal to about 50 nm to less than or equal to about 150 nm, optionally greater than or equal to about 90 nm to less than or equal to about 140 nm, for example, about 100 nm. As the thickness of the photoresist material 68 layer varies, an aspect ratio of the patterns formed therein may vary accordingly. In certain aspects, a thickness of the photoresist material 68 layer may be as great as 150 nm, while desirably maintaining the intensity and uniformity.

In one variation, a suitable photoresist material 68 may be a negative E-Beam Resists called AR-N 7500™ commercially available from ALLRESIST, GmbH. AR-N 7500™ is a liquid resist containing Novolak resins, naphthochinondiazides and crosslinking compounds in a propylene glycol methyl ether acetate solvent. Such a resist is a non-chemically amplified resist with good sensitivity, very high resolution (less than about 30 nm) and an excellent process and plasma etching stability. This resist is characterized by a high process stability which is due to the fact that the crosslinking is not based on the principle of chemical enhancement. Further, both e-beam and UV exposure (310-450 nm) is possible for development. In the UV-wavelength range of about 310 to 450 nm, the resist AR-N 7500 can work as a positive or negative, depending on the wavelength. Nanolithographic patterns of about 20 to about 80 nm with film thicknesses between about 80 nm to about 400 nm can be produced. The resists are characterized by a high contrast (e.g., greater than 5).

A pattern can be developed in an aqueous alkaline developer, such as AR 300-35, also commercially available from ALLRESIST GmbH. The 300-35 developer is a colorless, concentrated aqueous alkaline solution and can be used by immersion and puddle development. The developer AR 300-35 is a buffered system with wide range of process parameters. In other cases, the developer concentrate can be diluted with deionized water according to requirements of pattern generation. The constant processing quality is guaranteed by controlling normality as well as sensitometry of test resists.

Other alternative photoresists may include MICROPOSIT™ S1800 series commercially available from Shipley, especially MICROPOSIT™ S1805 are particularly suitable positive photoresist materials. Other suitable radiation curable liquid materials may comprise epoxysilicone, epoxy precursor, such as SU-8 photoresist (a negative epoxy photoresist commercially available from MicroChem Corp. (Newton, MA)), or thermal or photocurable silsesquioxane. One suitable curable liquid material comprises an ultraviolet light-curable epoxy-silsesquioxane (SSQ). SSQ polymers, poly(methyl-co-3-glycidoxypropyl) silsesquioxanes ($T^{Me}$-$T^{Ep}$), poly(phenyl-co-3-glycidoxypropyl) silsesquioxanes ($T^{Ph}T^{Ep}$), and poly(phenyl-co-3-glycidoxypropyl-coperfluorooctyl) silsesquioxanes ($T^{Ph}T^{Ep}T^{Fluo}$), are precisely designed and synthesized by incorporating the necessary functional groups onto the SSQ backbone. Such materials are described in Pina-Hernandez et al., "High-Resolution Functional Epoxysilsesquioxane-Based Patterning Layers for Large-Area Nanoimprinting," ACS Nano, vol. 4, no. 8, 2010, pp. 4776-4784, incorporated herein by reference in its entirety. An example of a suitable curable liquid material comprises an epoxy-SSQ (TPhenyl$_{0.4}$Q$_{0.1}$TEpoxy$_{0.5}$) mixed with 3 wt. % photoacid generator (UV-9820, Dow Corning Corp.) and diluted with propylene glycol monomethyl ether acetate (PGMEA) to make a SSQ resist solution containing 10-20 wt. % SSQ.

Other suitable liquid curable materials are described in Pina-Hernandez et al., "High-Throughput and Etch-Selective Nanoimprinting and Stamping Based on Fast-Thermal-Curing Poly(dimethylsiloxane)s," Adv. Mater. Comm., DOI: 10.1002/adma.200601905 (2007), pp. 1-7, incorporated herein by reference in its entirety. Yet other suitable liquid curable materials include those described in Cheng et al., "Room-Temperature, Low-Pressure, Nanoimprinting Based on Cationic Photopolymerization of Novel Epoxysilicone Monomers," Adv. Mater. 17 (11) (2005), pp. 1419-1424, incorporated herein by reference in its entirety. Yet other curable photosensitive polymeric materials, including photoresist materials, known or to be discovered in the art are likewise contemplated.

In the device 50, the photoresist material 68 is applied onto a multilayered structure 70 that includes at least one second metal layer 72 and at least second dielectric material layer 74. The multilayered structure 70 as shown in FIG. 1 includes two (2) dielectric layers 74 sandwiching a single (1) metal layer 72, by way of example. The multilayered structure 70 enhances the electric field inside the photoresist material 68 layer by reflection and cavity resonance. In certain aspects, a thickness of the second metal layer 72 is greater than or equal to about 10 nm to less than or equal to about 70 nm, which can help tune the effective mode propagating in the photoresist material 68 layer. In certain other aspects, a thickness of the second dielectric material layer 74 is greater than or equal to about 14 nm to less than or equal to about 20 nm, which can enhance the uniformity of the light in the photoresist material 68 layer along a vertical direction.

The multilayered structure 70 may be disposed on a substrate 76, which may be formed of conventional substrate materials, such as silicon dioxide, glass, metals, and polymers, by way of non-limiting example. In certain variations, the substrate 76 may be flexible, such as a flexible polymeric substrate that enhances or facilitates contact between the ENZ HMIM stack 60 and the photoresist material 68. Suitable flexible substrate 76 materials may include polyester films, such as polyethylene terephthalate (PET), polyethylene naphthalate (PEN), and the like.

Figure 2:
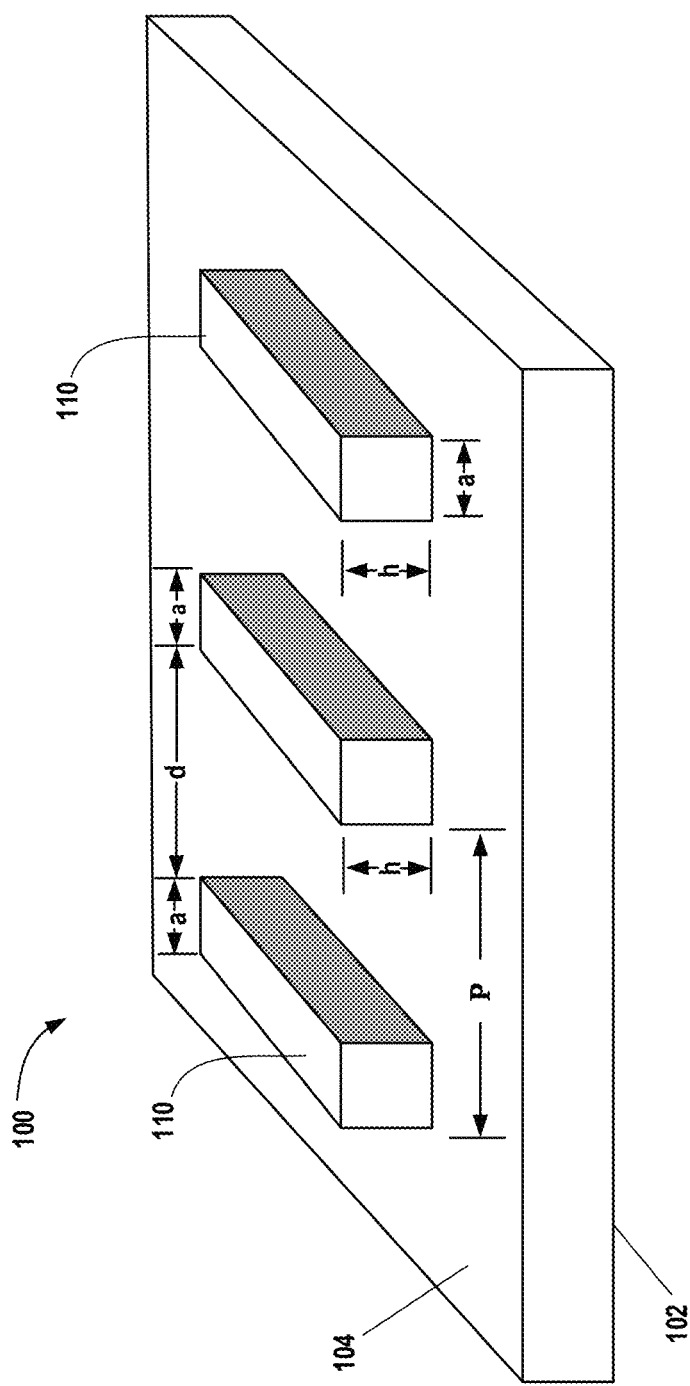
FIG. 2 is a schematic illustrating principles of an exemplary grating pattern for a photomask used in accordance with certain aspects of the present disclosure.

The device 50 also includes a photomask 80, which can be a periodic grating comprising a plurality of metal structures 82. For purposes of illustration, FIG. 2 shows a representative schematic of a grating structure 100 where electromagnetic radiation or light can resonantly transmit through nano-slits or openings between metal structures. The grating structure 100 defines a pattern that is formed over a substrate 102 having a major surface 104. The grating pattern may be formed from an electrically conductive material, such as a metal, like any of those described above, including aluminum (Al), gold (Au), copper (Cu), silver (Ag), combinations and alloys thereof. A plurality of substantially parallel rows 110 can be formed from thin film conductive materials on the major surface 104.

The grid or grating pattern of the grating structure 100 of metal rows formed on substrate 102 defines a period "A" or "P" (a distance defined from a first side of a first row 110 to a first side of a second adjacent row 110). A distance "d" between adjacent rows 110 is considered an opening (or aperture or slit). It should be noted that distance "d" may vary through the grating structure 100 pattern, where d is represented by d=P−a. A metal row 110 has a height "h" and a width of each metal row 110 is "a." A duty cycle is defined by fra/P. Periodicity refers to at least one period (P) between a pair of rows 110 in the grating pattern, but where there are more than two openings typically to a repeating period (P) in the grating pattern. In one exemplary embodiment, the period (P) between grating rows 110 is about 700 nm, the width (a) of each row 110 is about 70 nm, and the height (h) of each metal row 110 is about 40 nm. Thus, a high transparency resonator structure can be designed by adjusting metal row width (a) and period (P) so that different wavelengths of light can be transmitted through openings (d). High conductance can likewise be achieved by adjusting the thickness (h) of the film of metal material forming rows 110. Such a grating structure 100 pattern provides a highly flexible design that can be readily tailored for different performance criteria.

The duty cycle of the grating structure 100 can determine the intensity, as well as the contrast, of the patterns formed in the photoresist material 68. The pitch of the pattern is determined by the period of the grating, for example, by calculating $P=\Lambda/6 \approx 2\lambda/n_{eff}$ at 405 nm wavelength, where P is the period of the grating mask, patterns made by interference have the period of $\Lambda/6$ $\Lambda$, where $\lambda$ is a wavelength of light entering the grating structure 100, and $n_{eff}$ is effective mode index. In certain variations, a grating duty cycle (f) of the grating structure 100 is greater than or equal to about 0.5 to less than or equal to about 0.9 to provide uniform light distribution in the photoresist material 68 layer. The larger the duty cycle ratio, the more uniform of a pattern is formed in the photoresist material 68. A period (P) of the grating structure 100 may be greater than or equal to about 695 nm to less than or equal to about 702 nm in one variation. The uniformity of the pattern formed in the photoresist material 68 layer can vary significantly if the period is not within this range, when light being directed at the device has a wavelength of about 405 nm in the regime. A thickness (h) of a film of metal material forming rows 110 can be greater than or equal to about 25 nm to less than or equal to about 60 nm, in certain variations. More light can be transmitted into the ENZ HMM 60 stack to the photoresist material 68 layer when the thickness (h) is reduced and the rows 110 of the grating structure 100 are thinner. In certain aspects, as described further below, where the ENZ HMM 60 stack is a Type II ENZ HMM, the special field distribution inside this metamaterial can be used to create deep subwavelength patterns in a photoresist material layer 68, with a half-pitch ⅙ of the photomask's grating period.

With renewed reference to FIG. 1, an index matching layer or material 84 may be provided surrounding, within, and/or adjacent to the photomask 80. As shown in FIG. 1, the metal structures 82 are embedded within the index matching material 84. The index-matching layer may have a thickness of about 50 nm in certain variations and may comprise a polymer, such as polymethyl methacrylate (PMMA). A final transparent protective layer 86 may be disposed over the photomask 80 and/or index-matching layer 84, which may be formed of glass in certain variations. Notably, of each of the layers and components discussed above in the device 50 design, each layer or component can be offset by approximately 8 nm.

In one variation, the ENZ HMM 60 may include alternating layers of aluminum (Al) as the metal layer and aluminum oxide ($Al_2O_3$) as the dielectric material. In certain aspects, as discussed in more detail below, such an ENZ HMM 60 stack forms a Type II ENZ HMM (Tangential Permittivity ($\epsilon_\parallel$)→0 and Vertical Permittivity ($\epsilon_\perp$)>0) for nanolithography at a wavelength of 405 nm, i.e., the h-line in UV lithography. It is worth noting that similar ENZ HMM material designs can be utilized to realize lithography at other wavelengths of incoming light, including 365 nm (i-line) as well as deep ultra-violet (DUV) 248 nm and 193 nm, by way of example. Further, as noted above, the metal/plasmonic material is not limited to aluminum. A silver (Ag) based ENZ HMM at wavelength of 405 nm with an appropriate fill ratio has the same properties as that of aluminum-based ENZ system. Although a plasmonic lithography system usually relies on the spatial frequency selection principle, in accordance with certain aspects of the present teachings, HMMs can be analyzed in terms of mode expansion and wave propagation. By investigating these optical properties of the Type II ENZ HMM, the special field distribution inside this metamaterial can be used to create deep subwavelength patterns in a photoresist material layer, with a half-pitch ⅙ of the photomask. The ability to reduce period of the mask grating can greatly alleviate the difficulty otherwise involved in fabricating a mask to achieve such high aspect ratio, fine resolution nanostructures. Furthermore, the light intensity in the photoresist material layer is comparable with the incident light, which can significantly reduce the exposure time and thus improve the throughput of lithography.

As discussed herein, different types of HMMs can be applied to lithography applications, which are explored by correlating HMM dispersion properties to the simulated lithographic patterns. For an HMM made of 7 layers of Al/$Al_2O_3$ in a stack, both the tangential and vertical components $\epsilon_{xx}$ and $\epsilon_{zz}$ are frequency dependent, and the signs of $\epsilon_{xx}$ and $\epsilon_{zz}$ determine the type of the metamaterials. As shown in FIG. 3A, the type of the metamaterials depends on the light wavelength and the fill ratio of aluminum (Al). Specifically, it is a Type I HMM ($\epsilon_{xx}$>0 and $\epsilon_{zz}$<0) for shorter wavelengths (<186 nm), while a Type II MINI ($\epsilon_{xx}$<0 and $\epsilon_{zz}$>0) at longer wavelengths with a wide range of fill ratios. The structure becomes an effective dielectric ($\epsilon_{xx}$>0 and $\epsilon_{zz}$>0) when Al fill ratio is small, or an effective metal ($\epsilon_{xx}$<0 and $\epsilon_{zz}$<0) when Al fill ratio is large. To demonstrate how light propagates in HMMs, three typical scenarios with different wavelengths and fill ratios are studied: (1) a Type I ENZ HMM ($\epsilon_{xx}$→0 and $\epsilon_{zz}$>0) with $\epsilon_{xx}$=−0.008693−0.1644i and $\epsilon_{zz}$=−25.2214+9.9793i for f=16/30 (FIGS. 3B(1) and 3C(1)) at the wavelength of 175 nm; (2) a Type II HMM ENZ ($\epsilon_{xx}$→0 and $\epsilon_{zz}$0) with $\epsilon_{xx}$=−0.04974+0.5014i and $\epsilon_{zz}$=3.2219+0.009919i for f=6/53 (FIGS. 3B(2) and 3C(2)) at the wavelength of 405 nm; (3) a Type II HMM with $\epsilon_{zz}$=−3.1372+1.0422i and $\epsilon_{zz}$=3.8202+0.02898i for f=12/53 (FIGS. 3B(3) and 3C(3)) at the wavelength of 405 nm.

The transverse magnetic TM wave propagating in an HMM is described by the following equation $k_x^2/\epsilon_{zz}+k_z^2/\epsilon_{xx}=k_0^2$. In FIGS. 3B(1)-3B(3), the black circle shows the index ellipsoid of air, and magenta hyperbola depicts the iso-frequency curve of HMM as a function of the normalized wavevector $k_x/k_0$ and $k_z/k_0$. The light is incident downwards from air (represented by the upper panels with $k_z$>0) to the HMM (lower panels with $k_z$<0), where the conservation of transverse moment is required at the interface of air and PR. When $k_x$ and $k_z$ have real solutions, the corresponding waves are allowed to propagate in the effective media; otherwise, the waves are forbidden. The white and green regions correspond to the allowed zones for propagating waves, while the grey regions represent the forbidden zones where waves are evanescent in air and the HMMs, respectively. Simulation for the light incident through a double-silt mask is performed to demonstrate the dependence of light propagation on the dispersion relation of HMM. The corresponding electric field distributions $|E|^2$ are shown in FIGS. 3C(1)-3C(3). The TM polarized plane wave travels from the positive z-axis in air with zero angle of incidence, and transmits through a 150-nm-thick chrome (Cr) photomask. Two slits have a width w of 20 nm and a separation of 700 nm. A poly(methyl methacrylate) (PMMA) layer with a thickness of 50 nm as an index matching layer is placed underneath the photomask, followed by HMM comprising 7 layers of alternating stacked Al and $Al_2O_3$ films.

When the width of the slits is much smaller than the wavelength of incidence, i.e., w<<$\lambda$, the excited wavevector becomes high $|k_x|$>>$k_0$. Therefore, high-k eigenmodes can be efficiently excited inside the MINI because of the sub-wavelength nanoslits located in the near-field proximity of the HMM. Based on the conservation of momentum, the waves in Type I HMM are propagating when incident from air, but the waves in Type II HMM are evanescent (FIGS. 3B(1)-3B(3)). At a wavelength of 175 nm (FIGS. 3B(1) and 3C(1)), the HMM is made of a stack of 7 alternating layers of 16 nm thick Al and 14 nm thick $Al_2O_3$, and the field propagates directionally in the Type I ENZ HMM. This type of ENZ HMM has shown the capability in light confinement, despite the deep sub-wavelength aperture size. However, it is distinctively different from the Type II ENZ HMM that comprises a stack of 7 alternating layers of 6 nm thick Al and 47 nm thick $Al_2O_3$ films (FIGS. 3B(2) and 3C(2)). Because $\epsilon_{xx} \to 0$ the electric field in the Type II ENZ HMM remains constant and propagates straightly along the vertical direction, but periodic patterns with smaller features are formed inside the HMM along the horizontal direction, which is the result of interference of light diffracted from the two nanoslits. For a Type II HMM with 7 layers of 12 nm thick Al and 41 nm thick $Al_2O_3$ (FIGS. 3B(3) and 3C(3)), the diffracted light diverges from the slit with a large angle and forms interference patterns. All three scenarios can be used for lithography: B(1)/C(1) can produce 1:1 patterns; while B(2)/C(2) and B(3)/C(3) can both produce patterns with period smaller than that of the mask.

Comparing the optical intensity in the photoresist material layer on the other hand, the field in the Type II ENZ HMM (C(2)) is orders of magnitude stronger than that in a regular Type II MINI (C(3)). Silver (Ag) based Type II ENZ HMM also have the same advantageous properties. Type II ENZ HMM materials offer the advantages of not only producing features smaller than the patterns on the mask, but also transmitting much higher optical intensity to the photoresist material layer. Therefore, Type II ENZ HMM is a particularly suitable optical metamaterial structure having an effective in-plane permittivity of approximately 0 for use in accordance with certain aspects of the present disclosure. In certain variations, the Type II ENZ HMM is used with deep subwavelength lithography.

As background, to better understand the unusual field distribution within the MINI and utilize it properly in lithography, a waveguide structure with HMM as its core and photoresist (PR) as claddings is considered. Using $\epsilon_1$ for PR and $\bar{\epsilon}$ for HMM as an effective medium, by matching the boundary conditions for $H_y$ and $E_x$ at the interface z=0 with $\epsilon_{zz} \cdot \epsilon_1 < 0$, the corresponding $k_x$ with surface wave resonance point $k_{sw}$ can be solved as, $k_{sw} = k_0 \sqrt{(\epsilon_1 - \epsilon_{xx})/(\epsilon_1/\epsilon_{zz} - \epsilon_{xx}/\epsilon_1)}$. The two surface waves at each interface can couple with each other and form a waveguide mode. For the waveguide with Type II HMM as a core and PR as claddings, the solution to $TM_0$ mode is $\gamma_0 d = 2 \operatorname{arctanh}(-\alpha_0 \epsilon_{xx}/\gamma_0 \epsilon_1)$, where the decay wavevector is $\alpha_0 = \sqrt{\beta_0^2 - \epsilon_1 k_0^2}$ in the cladding and $\gamma_0 = \sqrt{\epsilon_{xx} \beta_0^2/\epsilon_{zz} - \epsilon_{xx} k_0^2}$ in the core made of HMM, $\beta_0$ is the tangential wavevector and d is the thickness of the waveguide. Although $\epsilon_{xx} \to 0$ for both Type I and II ENZ MINI, the behaviors are completely different. Specifically, the magnetic field $H_y(z)$ and $H_y(x,z)$ in the Al based Type II ENZ HMM are shown in FIG. 4A. The field in core of the waveguide is uniform, resembling a mode propagating horizontally because $H_y(z) = H_0 \cosh(\gamma_0 z) \to H_0$, which is independent of z when $\gamma_0 \to 0$. Because the waveguide mode is in the forbidden zone for both MINI and PR, it is a plasmonic mode resonating at the interface of HMM and PR. The uniform wave front observed in the MINI (FIG. 4A) when treated as an effective medium corresponds to the coupling of long-range surface plasmon (LRSP) of individual $Al_2O_3$—Al—$Al_2O_3$ waveguide in the actual multilayer structure. Moreover, the loss of the $TM_0$ in the Type II ENZ HMM is also much lower. As a result, the propagation length and decay length becomes also much longer.

The reduced loss in this case, as compared with typical Type II HMM based lithography, greatly improves the process by significantly reducing the PR exposure time. Furthermore, the high k of mode improves the resolution of the lithography. When the cutoff frequency is in the evanescent region (i.e., $k_{cutoff} > k_0$), much smaller features can be generated. The resolution limit can be expressed as a function of the cutoff frequency $4\pi/k_{cutoff} \approx 2\lambda/n_{eff}$, where $n_{eff}$ is the effective mode index determined by $\beta_0/k_0$. In addition, the Type II ENZ HMM can also benefit from filter effects as illustrated in FIG. 4B. In the k space, the diffraction orders of the grating with period of 700 nm are given by the red arrows. The OTF, i.e., $|H_t/H_i|^2$ shows a narrow band transmission, where the $H_t$ and $H_i$ are the transmitted and incident magnetic field, respectively. In this design, only the $3^{rd}$ diffraction of the grating is selected with its diffracted wavevector coinciding with the resonant peak of the OTF, while the other orders are blocked and cannot reach PR layer. With these characteristics, Type II ENZ HMM is an excellent for use in nanolithography for subwavelength patterns with high field contrast and uniformity.

A plasmonic device with an HMM ENZ lens for UV lithography is shown in FIG. 5A and is similar to that shown in FIG. 1. A one-dimensional (1-D) periodic Al grating is used as the photomask, and the Type II ENZ HMM stack is placed in contact with a PMMA spacer as an index-matching layer, followed by the PR layer to record the imaged patterns. Additional Al and $Al_2O_3$ layers are placed beneath the PR layer to enhance the field inside the PR by reflection and cavity resonance. The Al grating is used in the mask to increase the field contrast because of the light coupling, and similar results can be obtained experimentally by Cr mask with an Al-based ENZ HMM as well. In addition, the system can be placed on a flexible polymer substrate to ensure intimate contact between the MEW lens and the PR layer.

To make a robust design, the effects of the geometric parameters in the design including the thickness of each layer, duty cycle and period of the grating etc. via simulation (COMSOL) are studied. The duty cycle of the grating determines the intensity as well as the contrast of the patterns. The pitch of the pattern is determined by the period of the grating: $\Lambda = P/2m$, where m is the diffraction order. Using an optimized design, the normalized electric field intensity distribution $|E|^2$ of the latent image in the PR layer is shown in FIG. 5B for one mask period, illuminated by TM polarized light with the wavelength of 405 nm. The Al grating has thickness of 25 nm, duty cycle of 75%, and period of 700 nm. The PMMA spacer has thickness of 50 nm, which is on top of the HMM made of a stack of seven total layers of 6 nm thick Al and 47 nm thick $Al_2O_3$ layers. The PR has thickness of 100 nm, the bottom Al layer has a thickness of 20 nm, and the two $Al_2O_3$ films have the thickness of 47 nm.

Within one period, six periodic patterns are created, because the third diffraction of the grating is employed for exposure. An additional reduction factor of two comes from the interference of two counter-propagating waveguide modes. Comparing the normalized field distribution, the field intensity in the PR is strong, and the aspect ratio of the patterns is high. Moreover, the additional Al and $Al_2O_3$ layers underneath the PR not only further improve the contrast and uniformity of the patterns in the simulations, but also reduce the film roughness in the fabrication. The $|E|^2$ distribution along horizontal lines in the PR is illustrated in FIG. 5C, where the amplitude of the periodic distributions at the top, middle and bottom positions are comparable, which means that the field distribution is uniform along the vertical position. The field contrast can be calculated as $(|E_{max}|^2-|E_{min}|^2)/(|E_{max}|^2+|E_{min}|^2)\sim 0.915$, which is sufficiently high for exposure and to obtain high contrast ratio in images. The average field distribution $|E|^2$ is around 0.225, which is near a quarter of the incident light set a 1V/m. It should be noted that the field is several orders of magnitude stronger compared with other system using HMM, which is due to the low loss of the specially designed waveguide mode supported by ENZ HMM use in the lithographic patterning devices prepared in accordance with certain aspects of the present disclosure.

Moreover, based on the simulations, the dependence of the parameters such as the thickness of each layer is acceptable for the experiments, with tolerance of a few nanometers indicating the robustness of the design. Due to the low loss and high anisotropy of Type II ENZ HMM, the patterns in the PR are much smaller than the photomask while maintaining strong field intensity, high aspect ratio, and good uniformity.

In certain aspects, the present disclosure contemplates a method for plasmonic lithography. The method may include passing electromagnetic radiation having a predetermined wavelength into a plasmonic device. The predetermined wavelength may be a range of wavelengths. As discussed above, the predetermined wavelength may be greater than or equal to about 10 nm to less than or equal to about 750 nm. The plasmonic device comprises a photomask having a plurality of openings and an optical metamaterial structure having an effective in-plane permittivity of approximately 0, such as any of those discussed above. The electromagnetic radiation thus passes into the plasmonic device and can generate a single plasmonic resonant mode inside the optical metamaterial structure. The electromagnetic energy then passes from the optical metamaterial structure and plasmonic device to a photosensitive material disposed beneath the plasmonic device. This forms a pattern comprising a nanofeature or nanostructure in the photosensitive material.

The nanofeature has at least dimension (for example, the smallest dimension) that is less than ⅓ of the predetermined wavelength (where there is a range of wavelengths, the dimension of the nanofeature may be less than ⅓ of the longest wavelength in the range). In certain variations, the nanofeature has at least dimension that is less than ¼ of the predetermined wavelength of electromagnetic radiation directed towards the plasmonic device, optionally less than ⅕, optionally less than ⅙, and in certain variations, optionally less than about ⅐ of the predetermined wavelength of electromagnetic radiation directed towards the plasmonic device. In other aspects, the nanofeature has at least dimension that is less than ¼ of the period of the photomask in the plasmonic device, optionally less than ⅕, and in certain variations, optionally less than ⅙ of the period of the photomask in the plasmonic device.

In certain aspects, the nanofeature is "nano-sized" or "nanometer-sized" and have at least one spatial dimension that is less than about 1 μm (i.e., 1,000 nm), optionally less than about 0.5 μm (i.e., 500 nm), optionally less than about 0.4 μm (i.e., 400 nm), optionally less than about 0.3 μm (i.e., 300 nm), optionally less than about 0.2 μm (i.e., 200 nm), and in certain variations, optionally less than about 0.1 μm (i.e., 100 nm). Accordingly, a nanofeature has at least one spatial dimension that is greater than about 1 nm and less than about 1,000 nm (1 μm) in certain variations. It should be noted that so long as at least one dimension of the nanofeature falls within the above-described nano-sized scale (for example, width or height), one or more other dimensions (for example, length or width) may well exceed the nano-size.

In certain aspects, the nanofeature formed by such a method has an aspect ratio of greater than or equal to about 2:1 or higher. Generally, an aspect ratio (AR) for elongated shapes is defined as AR=H/W, where H is a height of the nanofeature and W is width of the nanofeature formed by such a lithography patterning method. Suitable aspect ratios, for example, may range from greater than or equal to about 1:1 to less than or equal to about 3:1, for example. In yet other aspects, such axial geometry particles may have an aspect ratio of 5,000 or more and in certain variations 10,000 or more.

In certain aspects, the pattern comprises a plurality of nanofeatures and the plurality of nanofeatures formed is substantially uniform. By "substantially uniform," it is meant that the nanofeatures that are formed by the present methods are generally monodisperse in size. This method can result in nanofeatures or nanostructures that have size distributions that deviate less than about 30%, optionally less than about 20%, optionally less than about 15%, optionally less than about 10%, optionally less than about 5%, and in some aspects, less than about 1% in size and dimensions. In one aspect, a first dimension of a first nanofeature deviates less than 30% from a second dimension of a second nanofeature when it is substantially uniform.

In yet other aspects, the nanofeature formed by such a method has a high fidelity and/or high resolution down to about 55 nm.

In other aspects, an average field intensity of light that reaches the photosensitive material is greater than or equal to about one half of the incident light.

As noted above, the optical metamaterial structure in the plasmonic device may be any of those described previously above. Thus, in certain aspects, the optical metamaterial structure may be any of the following:

Type I HMM (where $\epsilon_{xx}>0$ and $\epsilon_{zz}<0$);
Type II HMM (where $\epsilon_{xx}<0$ and $\epsilon_{zz}>0$);
Type I ENZ HMM (where $\epsilon_{xx}\to 0$ and $\epsilon_{zz}>0$); or
Type II HMM ENZ (where $\epsilon_{xx}\to 0$ and $\epsilon_{zz}>0$).

Each of these materials has significant differences in electromagnetic properties, such as dispersion, light transmission, mode propagation, and the like.

In certain aspects, the optical metamaterial structure in the plasmonic device may be an epsilon-near-zero (ENZ) hyperbolic metamaterial (HMM) is a Type II epsilon-near-zero (ENZ) hyperbolic metamaterial (HMM) that generates the single plasmonic resonant mode. In the Type II ENZ HMM, due to the high anisotropy, only one plasmonic mode can propagate horizontally with low loss in a waveguide system where the ENZ HMM serves as a core. Thus, Type II ENZ MINI materials offer the advantages of not only producing features smaller than the patterns on the mask, but also transmitting much higher optical intensity to the photoresist material layer. For example, the electric field in the Type II ENZ MINI remains constant and propagates straightly along the vertical direction, but periodic patterns with smaller features are formed inside the MINI along the horizontal direction, which is the result of interference of light diffracted from between two adjacent nanoslits/nanoopenings. Type II ENZ HMM materials offer the advantages of not only producing features smaller than the patterns on the mask, but also transmitting much higher optical intensity to the photoresist material layer. Due to the low loss and high anisotropy of Type II ENZ HMM, the patterns thus formed in the photosensitive material are much smaller than the openings in the photomask, while maintaining strong field intensity, high aspect ratio, and good uniformity.

In one variation, the epsilon-near-zero (ENZ) hyperbolic metamaterial (HMM) comprises a stack comprising at least one metal layer and at least one dielectric layer. The at least one metal layer optionally comprises a metal selected from the group consisting of: aluminum (Al), gold (Au), copper (Cu), silver (Ag), combinations and alloys thereof. The at least one dielectric layer optionally comprises a dielectric material selected from the group consisting of: aluminum oxide ($Al_2O_3$), silicon dioxide ($SiO_2$), silicon nitride ($Si_3N_4$), zinc selenide (ZnSe), zinc oxide (ZnO), zirconium oxide ($ZrO_2$), titanium oxide ($TiO_2$), tantalum pentoxide ($Ta_2O_5$), dielectric polymers, and combinations thereof.

In other aspects, processes for fabricating a plasmonic lithographic patterning device according to certain aspects of the present disclosure are contemplated, as follows. An exemplary fabrication process of the plasmonic lithography is shown in FIGS. 6A-6J. More specifically, the fabrication process of the photomask and substrate of the ENZ lithography is illustrated. A metal (Al) layer with a thickness of 25 nm is deposited via e-beam evaporation on a clean glass substrate as in FIG. 6A, followed by the spin coating of a PMMA layer. A grating with period of 700 nm and duty cycle of 75% is obtained by electron beam lithography (EBL) shown in FIG. 6B, and the Al grating with the same period is achieved by reactive ion etching (RIE, LAM 9400) as shown in FIG. 6C. The top view SEM image of the Al grating is shown in FIG. 6H.

A thin PMMA layer with a thickness of 55 nm is spin-coated on top of Al grating as a spacer layer, which is flattened by thermal nanoimprint lithography (NX-2000 Nanonex) in FIG. 6D. After planarization, a multilayer structure made of alternating 6 nm Al and 47 nm $Al_2O_3$ layers is deposited on the PMMA spacer by e-beam evaporation, as in FIG. 6E. The cross-section SEM image of the multilayer structure on a reference Si sample is shown in FIG. 6I. For the preparation of the substrate, regular PET films are planarized by spin coating of a 10 μm thickness SU-8 resist, followed by e-beam evaporation of 47 nm $Al_2O_3$, 20 nm Al and 47 nm $Al_2O_3$ films in a stacked configuration in FIG. 6F. The PR used in the experiment is 1:1 diluted AR-N 7500.18 positive resist at 405 nm wavelength. The diluted PR layer with 100 nm thickness is spin-coated on the $Al_2O_3$ layer, and soft baked on a hot plate at 85° C. for 1 minute. Ensuring the conformal contact between the photomask and substrate is the same as shown in the waveguide lithography. The Al/$Al_2O_3$ ENZ HMM mask and the PR coated PET substrate are in conformal contact in a specially designed stage during exposure. Collimated 405 nm diode laser (ONDAX x6474) light with TM polarization is incident onto the mask through a circular aperture with diameter of approximately 1 cm. The laser intensity is set at 3 mW·$cm^{-2}$ and the exposure lasts for about 4 mins. Finally, the resist on PET is immersed in 1:1 diluted AR 300-35 developer for 50~55 seconds, followed by 30 seconds deionized (DI) water rinse. Simulations in this work are performed in COMSOL 5.1 and calculation is done by MATLAB 2015. All the optical constants used in the simulations are as follows.

The permittivity of Ag is frequency dependent and can be expressed using Drude-Lorentz model with five oscillators. All the other optical constants are extracted from either the ellipsometry measurement, data from books, or the product information. The refractive index of the PR is $n_{PR}$=1.691+0.0346i at 405 nm, 1.702+0.44i at 248 nm and 1.709+0.055i at 193 nm. The flexible polymer substrate is a polyethylene terephthalate (PET) sheet, and the index of the PET substrate $n_{PET}$=1.65+0.03i at 405 nm, 1.69+0.04i at 248 nm and 1.70+0.06i at 193 nm. The relative permittivity of the index matching layer PMMA is $n_{PMMA}$=1.505 at 405 nm, 1.562 at 248 nm and 1.6302 at 193 nm wavelength. The refractive index of aluminum oxide ($Al_2O_3$) is $n_{Al2O3}$=1.68 at the wavelength of 405 nm, 1.79 at 365 nm, 1.83 at 248 nm and 1.92 at 193 nm. The relative permittivity of Al used in the simulation is $\epsilon_m$=−22.476+4.429i at 405 nm, −19.495+3.616i at 365 nm, −8.098+1.118i at 248 nm and −4.850+0.494i at 193 nm. The permittivity of Al and the index of $Al_2O_3$ at 175 nm is −3.4680+0.3083i, and 1.98, respectively.

To verify the theoretical and numerical calculations, the experiment is carried out using the Al based ENZ metamaterial at 405 nm wavelength, made of 6 nm Al and 47 nm $Al_2O_3$. The scanning electron microscopy (SEM) images of the resulting patterns are shown in FIGS. 7A-7C. As shown in the schematic in FIG. 5B, the period of the grating mask is 700 nm; however, the patterns made by interference have the period of Λ/6, which is around 117 nm. Subwavelength patterns with a half-pitch of 58.5 nm are achieved, which is 1/7 of the light wavelength. The angled and cross-section view of the pattern is illustrated in FIGS. 7B and 7C. The height of the PR is 100 nm, which leads to an aspect ratio of the pattern of around 2:1. The aspect ratio of the feature is lower than previous results of waveguide lithography, where the PR layer functions as the core of a waveguide. The pitch of the patterns can be calculated by the P=Λ/6≈2λ/$n_{eff}$ at 405 nm wavelength, where P is the period of the grating mask.

To see the cross-section view, the resist on the substrate is cut manually by a razor blade and deposited with gold/platinum (Au/Pt) alloy before SEM characterization. Along the periodic lines there is a tiny amount of roughness, which might result from the deposited metal and cutting during SEM characterization. The roughness can also be attributed to the defects on the mask, e.g., the deposited thin Al film, as well as the limitation of the sensitivity, resolution and contrast of the chosen PR at the exposure wavelength. The experimental conditions such as the polarization of the incident light and the bottom reflective layers also affect the experimental results. In addition, by double exposure or illumination of circularly polarized light, 2D periodic patterns can also be potentially accomplished.

In various aspects, an optical metamaterial structure in the form of an HMM comprising an Al/$Al_2O_3$ multilayer structure is demonstrated to be particularly suitable for use in a plasmonic lithography system for period reduction patterns. In the waveguide with a Type II ENZ HMM as its core, only a single plasmonic mode exists which can function as a high pass filter with low loss. These properties are suitable for the application in UV lithography to produce patterns with high fidelity, high aspect ratios, high field contrast as well as high uniformity. The feature size created in the interference system is much smaller than the period of the photomask and light wavelength. Experimentally, periodic patterns with a half pitch of 58.3 nm are achieved by light exposure with wavelength of 405 nm using the Al/$Al_2O_3$ lithography system. More specifically, periodic patterns with a half pitch of 58.3 nm can be achieved due to the interference of $3^{rd}$ order diffracted light of the grating. The lines were 1/6 of the mask with a period of 700 nm, and approximately 1/7 of the wavelength of the incident light. Furthermore, the present application contemplates use of different metals and light wavelengths. The ENZ HMM with anisotropy can be exploited for various other applications to create periodic structures with directional propagation, such as in natural HMM, waveguide system and integrated optics requiring extremely low loss.

In other aspects, the present disclosure contemplates a lithography system. The lithography system may include a plasmonic roller device for lithography. Here, the plasmonic roller device may comprise a grating structure having a plurality of openings, such as those described above that may function as a photomask. The plasmonic roller device may also comprise a plasmonic lens having a stack comprising at least one metal layer and at least one dielectric layer. Plasmonic lithography has the capability of delivering higher resolution nanofeatures by utilizing sub-wavelength confinement of surface plasmon polaritons (SPPs) excited on metal-dielectric interfaces. The lithography system may include a source of electromagnetic radiation having a predetermined wavelength that is directed into the plasmonic roller device. The lithography system may also include a substrate on which a photosensitive material is disposed. At least one of the plasmonic roller device or the substrate is movable with respect to the other. In certain variations, the substrate having the photosensitive photoresist material translates with respect to the roller. The roller thus rotates during the patterning process. The plasmonic roller device is capable of forming a pattern comprising a nanofeature having at least one dimension that is less than ⅓ of the predetermined wavelength in the photosensitive material. Notably, the source of electromagnetic radiation may emit light having a single wavelength or a range of wavelengths, in which case the nanofeature has a dimension that is less than ⅓ of the longest wavelength of the range.

FIGS. 8A-8D show an exemplary plasmonic roller system for lithography in accordance with certain aspects of the present teachings. FIG. 8A shows a schematic of a plasmonic roller system that includes a source of electromagnetic radiation (or exposure unit). Collimated light from UV or another radiation source can be used as the source of electromagnetic radiation. There can be an xyz-stage and a substrate moving unit. For example, a translatable stage may include a motor for x-y axis translation (also capable of z-axis translation). The plasmonic roller device includes the features described above, which may include a plasmonic lens having a stack comprising at least one metal layer and at least one dielectric layer, which is wrapped around a cylinder comprising a material that transmits the predetermined wavelength of electromagnetic radiation (e.g., UV light). The grating structure may likewise be wrapped around the cylinder of transparent material, as discussed further herein. In certain variations, the transparent material may comprise quartz. Together, the plasmonic lens and grating structure may create a photomask for plasmonic lithography. In one example, a hollow quartz cylinder may be used as a core of the roller device. It should be noted that such a cylinder is merely exemplary and other designs and materials are contemplated.

A low elastic modulus layer of elastomeric material, like polydimethyl siloxane (PDMS), can be wrapped as a cushion layer around the outer circumference of the quartz cylinder for conformal contact between the mask and PRcoated substrate.

Thus, a plasmonic roller system integrates a quartz mechanical roller with a specially designed photomask based on plasmonic waveguide lithography. Such plasmonic lithography systems can reach deep sub-wavelength resolution utilizing evanescent waves carrying high spatial frequency components. Deep sub-wavelength uniform patterns with high aspect ratios may thus be printed continuously over a moving substrate. Hence arbitrary, one-dimensional (1-D), and two-dimensional (2-D) patterns with deep sub-wavelength resolution can be obtained in these plasmonic structures using resonances with high spatial frequencies. In the planar plasmonic waveguide lithography systems described herein, photomask and photoresist (PR) systems are produced on flexible substrates to select high spatial frequencies, and the PR layer is incorporated into a plasmonic waveguide to ensure the uniform light exposure over its entire depth. By enabling rolling between the photomask and PR layer on the moving substrate, deep subwavelength patterns, for example, with a half-pitch of 61.25 nm, can be printed continuously. Such a plasmonic roller system can be used for the large-scale and cost-effective production of electronic and photonic devices.

In the photolithography system in FIG. 8A, a transparent quartz cylinder having the plasmonic photomask described above is placed on top of a stage, which is motorized in X-direction for rolling and manual in Z-direction for height control. A transverse Magnetic (TM) UV laser beam with a wavelength of 405 nm is directed into the quartz cylinder and illuminated onto the photosensitive/PR layer coated on the moving substrate. Since subwavelength periodic patterns (i.e. dense line and spacing) are used for lithography testing and characterization, the fabrication of 1-D patterns is demonstrated in the plasmonic roller system as described further herein.

FIG. 8B shows cross-sections of the plasmonic roller device cylinder and stage while moving. FIG. 8C shows a plasmonic roller lithography system and a photosensitive/PR film on flexible PET substrates illuminated by a transverse magnetic mode (TM) polarized laser beam. Parts (a) and (b) in FIG. 8B are shown in detail in FIG. 8C, which has the separate photomask (a) and photoresist/PR (b) on a polyethylene terephthalate (PET) substrate.

The photomask (a) and substrate (b) are mounted on low elastic modulus layers of elastomeric material, like polydimethyl siloxane (PDMS). For example, the photomask can be wrapped over the PDMS as a cushion layer around the outer circumference of a cylinder for conformal contact between the photomask and photosensitive/PR coated substrate. The one-dimensional (1-D) photomask as indicated by part (a) is made on a flexible polyethylene terephthalate (PET) substrate disposed on the transparent quartz cylinder in the exposure unit. The thickness of the PET substrate may be around 500 µm. The plasmonic photomask in the roller system also has an aluminum (Al) grating oriented along the y-axis with a representative period of about 245 nm, a thickness of about 22 nm, a duty cycle of about 50% and a width of about 120 nm. The Al grating is separated by a poly methyl methacrylate (PMMA) spacer layer from a planar Al layer, where the PMMA spacer is about 40 nm in thickness and the planar Al layer is about 10 nm in thickness, by way of example.

A photosensitive/PR layer may be coated on another flexible PET substrate, which is mounted on the motorized stage as indicated by part (b) in FIGS. 8B-8C. In one variation of the photosensitive layer, an aluminum film having a thickness of about 15 nm and an approximate 45 nm of $SiO_2$ layer are deposited on the PET substrate before coating of a 100-nm-thick photosensitive PR layer. These layers are used to couple the diffracted evanescent waves from the sub-wavelength grating mask to the PR centered waveguide layer and help to ensure the uniform light intensity distribution throughout the thickness of the PR layer.

Light (e.g., 405 nm light) generated by the source of electromagnetic radiation is directed onto the photomask. Upon illumination of a 405 nm laser beam polarized along x-axis, the flexible photomask and the PR are in conformal contact and rolling together, as illustrated by FIG. 8C. Because conformal contact between photomask and the photosensitive material/PR is used for plasmonic lithography system, both the photomask (a) and PR substrate (b) are supported by compliant, flexible, cushion layers made of elastomeric materials, such as polydimethylsiloxane (PDMS) films, as discussed above.

FIG. 8D shows a normalized electric field distribution $|E|^2$ when the photomask and substrate are in contact. Periodic distributions in the PR layer with enhanced light intensity by plasmonic effects. Incident $|E|^2$ is set as 1 $V^2/m^2$ and normalized average field in the PR is around 1.4 $V^2/m^2$. Uniform nano-scale patterns can be imaged onto the PR in the plasmonic roller system based on plasmonic waveguide lithography. Many diffracted modes are excited by the Al grating when it is illuminated by the TM polarized light with electric field perpendicular to grating line. But only the first order diffraction couples to the SPP waves at the Al/PMMA interface when the phase matching condition is met, i.e., $k_{spp} \sim 2\pi/p$, where p is the period of the grating. The planar Al film is added to the bottom of the photomask to block the direct incident light (i.e., the $0^{th}$ diffraction order), while transmitting the plasmonic resonance supported by the thin Al layer.

To form high aspect ratio features, the photosensitive/PR layer is sandwiched between low index materials to serve as the core of an optical waveguide. Due to the spatial frequency selection of evanescent waves, only the high-k resonances ($\pm 1^{st}$ order diffraction) are transmitted, and the high-contrast interference patterns of these two counter-propagating waves are imaged in the PR layer. A standing wave is formed in the waveguide with a high intensity contrast and a pattern depth throughout the PR layer. As the photomask and PR on the PET substrate are moving, the patterns generated in the optical waveguide can be printed continuously along the x-axis. The normalized electric field distribution of the plasmonic waveguide lithography system is shown in FIG. 8D assuming incident electric field amplitude is 1 V/m, where the intensity contrast in the PR expressed as $(|E|_{max}^2 - |E|_{min}^2)/(|E|_{max}^2 + |E|_{min}^2)$ is around 0.97. When the strong resonance is excited, the sinusoidal wave formed in the PR layer has an average light intensity 1.4 times stronger than that of the incident light, as the periodic light intensity distribution shown in FIG. 8D. The enhanced light intensity can provide a sufficient rolling speed with the required dose to expose the photosensitive material.

In certain aspects, the present teachings address the challenge of fabricating the roller system having a flexible photomask with subwavelength features. A new process is provided herein to fabricate the flexible photomask as illustrated in FIGS. 9A-9D. The photo and scanning microscope (SEM) images of the Al grating on PET are shown in FIGS. 9F-9G. In addition, the fabrication process of the PR layer is shown in FIG. 9E. Detailed fabrication of the mask and PR is described herein.

As shown in FIGS. 9A-9D, PET and silicon (Si) material layers with an area of 3 cm×3 cm are cleaned by acetone and isopropyl alcohol (IPA) in an ultrasonication bath for over 10 mins, followed by deionized (DI) water rinse and dry. Then the PET component is bonded onto the Si substrate by Norland Optical Adhesive (NOA) 73 epoxy. A small amount of NOA 73 epoxy is carefully dropped on top of the clean Si substrate, and slowly covered by the PET piece to avoid air bubbles. The epoxy bonding layer is cured for over 5 mins by a UV light source (Karl Suss MA 45S) with broadband intensity about 30 mJ/sec. The epoxy residue layer after cure on the bottom side of the Si is cleaned by acetone and IPA. To planarize the top surface of the PET piece, a SU-8 2010 film is spin coated with a thickness of 10 μm. The SU-8 layer is soft baked at 65° C. for 1 minute and exposed by the same UV light source for around 5 minutes, followed by a hard bake at 95° C. for another 5 mins. To prepare for PMMA spinning coating, the SU-8 layer is further cured at 180° C. for 5 mins before deposition of 100 nm $SiO_2$ and 22 nm Al. After planarization, a PMMA A4 layer is spin coated on the Al layer and patterned by electron beam lithography (EBL). The Al grating is achieved by reactive-ion etching (RIE) (LAM 9400) using the patterned PMMA as an etch mask.

Another PMMA spacer layer with thickness of 45 nm is spin coated on the Al grating and a planar layer of Al of 10 nm thickness is deposited on the spacer. When these steps are completed, the PET is peeled off the Si substrate to serve as a flexible photomask that can be wrapped around the quartz tube. Because the bonding force between epoxy and Si substrate is quite weak, the PET pieces are manually peeled off from Si substrates at room temperature in a cleanroom environment. The separation is kept along the same direction and under a constant speed. As a result, no obvious defect is found. After the peeling off process, the PET pieces are cleaned with acetone to remove any epoxy residue that might be left behind. Because the cured epoxy is transparent, it does not have any influence or interference in the results based on optical simulations.

The fabrication process of the PR layer on a flexible PET substrate is shown in FIG. 9E. A SU-8 2010 layer is spin coated on a clean PET layer to make the PET sheet smooth and flat, followed by the deposition of an Al layer with a thickness of about 15 nm and a $SiO_2$ layer with a thickness of about 45 nm. Generally, it is desired to have high quality of polarization alignment and conformal contact between the plasmonic roller device and the photosensitive material. Once the two prerequisites are met, the repeatability of the plasmonic waveguide process is quite good. The thin PDMS films are used for the conformal contact, which is helpful to prevent the mechanical defects as the PDMS buffer layers with low Young's modulus can reduce the force between photomask and substrate in rolling. The plasmonic lithography process provided here does not involve the demolding process as in roller-based nanoimprinting, so it does not create any defects due to mechanical deformation in the photosensitive material.

Two photomasks are fabricated by using electron beam lithography with a pattern area of 1.5 cm×500 μm and 1 mm×2 mm, with grating lines orientated along the short edge (y-axis). The photograph and microscopic images of the two masks are illustrated in FIGS. 9F and 9H, respectively. The Al grating on the PET substrate with a period of 245 nm and duty cycle of 50% is successfully achieved following the procedures, as shown in the SEM image in FIG. 9G.

Once the photomask and PR on flexible substrates are fabricated, they are mounted on the roller system, as shown in FIGS. 8A-8B and 10A-10B. The optical assembly of plasmonic roller lithography has a X-axis motorized stage with 2 μm resolution and 300 mm travel range for rolling, as well as a Z-axis manual stage with a 12.5 mm travel range to flexibly control the height. The transparent hollow-quartz cylinder has a diameter of 150 mm, a length of 170 mm and a thickness of 3 mm, with ball baring and jig on the edge of the cylinder supported by an Al profile. The polarized diode laser (ONDAX x6474) with a wavelength of 405 nm is mounted on a 3D stage. The light incident from the laser is reflected by optical mirrors and directed into the quartz cylinder. Before the light enters the cylinder, it travels through a linear polarizer with the polarization orientated along the horizontal direction (x-axis). The polarized light beam is reflected by a mirror mounted inside the cylinder and shines onto the plasmonic photomask. The PR coated on a PET substrate is mounted on a linear motorized stage that is also height adjustable offering more degrees of freedom. The stage assembly can move accurately using a step motor control system (PMC-HS, Autonics). This assembly is controlled by the motor system and moved at a speed of 200-300 µm/s. The moving speed is determined by the dose required by the photosensitive/PR material and the power intensity of the laser. For patterns with a length of 1.5 cm, the total exposure time is around about 50 to about 75 seconds. The exposure dose can be estimated as about 50 to about 75 mJ/cm$^2$ accordingly at the wavelength of 405 nm.

The two PDMS cushions with thicknesses around 5 mm are located at quartz cylinder and stage respectively, to ensure the conformal contact when the photomask was attached to the quartz cylinder. Contact between the stage and the quartz cylinder is established when the PR-coated region enters the UV light exposure zone and a constant stress is being applied on the substrate to ensure conformal contact. A positive resist AR 7500 is used for exposure, and then is developed in 1:1 diluted AR 300-35 developer for 60 seconds.

Continuous nano-scale patterns are successfully produced using the plasmonic lithography roller system, as shown in FIGS. 11A-11D. The patterned PET substrates are coated with a metallic alloy (gold and palladium) layer to avoid charging during the SEM characterization. The micrograph image of the developed PR on PET is shown in FIG. 11A and the patterned PR under an optical microscope is shown in FIG. 11B, respectively. In both images, the darker regions are the patterned PR films. Compared with the Al mask in FIGS. 9F and 9H, FIGS. 11A-11D show that the patterns on the flexible photomask can be printed onto the PR, for both photomasks with sizes of 1.5 cm×500 µm and 1 mm×2 mm. The SEM images of the patterns on the PR layer are shown in FIG. 11C (top view) and FIG. 11D (cross-section view), respectively. The periodic patterns have a half-pitch of around 61 nm on PR, which is ⅐ of the exposure light wavelength; and a thickness of 100 nm, which gives a height-width aspect-ratio of around 2:1. The results are very similar to our previous finding in plasmonic planer lithography, but the throughput of the system improves. The period of the patterns is one-half of the grating mask due to the interference of the first order diffracted waves from the grating. The printed feature size and height of the features can be tuned by changing the plasmonic waveguide structure. As illustrated by the SEM images, the subwavelength periodic patterns are substantially uniform in the exposed region. In this example, good pattern uniformity can be maintained within light beam size.

The plasmonic roller lithography system provided by certain aspects of the present teachings improves the throughput of planar plasmonic lithography as well as the resolution of the traditional photo-roll lithography (PRL) system, thus broadening their applications in nanoscale patterning. The patterns that can be printed in the plasmonic roller system are not limited to 1-D grating. For example, two dimensional (2-D), 2D dot, and hexagonal array structures can also be generated by multiple exposures in the experiment or using wave plates to generate circularly polarized light source, by way of non-limiting example. It is also possible to generate sub-wavelength arbitrary patterns by implementing plasmonic lithography technology, such as a superlens to replace the current waveguide scheme, or potentially utilizing the spin-orbit interactions in metasurfaces. The size of the mask and printed patterns may thus be the same. However, the process can be simply repeated to cover a longer length of the patterned region. Further, large-scale patterns with higher speed and throughput can be achieved by increasing the power of the UV laser and broadening the beam to cover the entire width of the substrate.

In certain other aspects, the present disclosure contemplates a method for plasmonic lithography comprising passing electromagnetic radiation having a predetermined wavelength into a plasmonic device that comprises a photomask having a plurality of openings and an optical epsilon-near-zero (ENZ) metamaterial structure having an effective in-plane permittivity of approximately 0. The plasmonic device is in the form of a roller and the optical epsilon-near-zero (ENZ) metamaterial structure is wrapped around a cylindrical component that transmits the electromagnetic radiation having the predetermined wavelength. The electromagnetic radiation generates a single plasmonic mode inside the optical epsilon-near-zero (ENZ) metamaterial structure and then passes to a photosensitive material disposed beneath the plasmonic device to form a pattern comprising a nanofeature in the photosensitive material. The passing occurs continuously to form the pattern. The nanofeature has at least dimension that is less than ⅓ of the predetermined wavelength. Any of the variations described above are contemplated for use in such methods.

A plasmonic roller lithography system is provided that uses photomasks and PR films on flexible PET substrates. The plasmonic roller system combines the advantages of the conventional photo-roll lithography (PRL) system and the planar plasmonic waveguide lithography to achieve continuous nano-scale patterning over a large area. Using a 405-nm-wavelength UV light source, deep subwavelength uniform patterns with a half-pitch of roughly 61 nm, a depth of 100 nm and a length of 1.5 cm are demonstrated on rolling substrates in a continuous fashion. Fabrication of large-area plasmonic masks could enable such systems to find practical applications in the large-scale production of electronics and photonics components such as flexible electronics, flexible wire grid polarizers and moth-eye structures for anti-reflection, by way of non-limiting example. Since the current immersion lithography at 193 nm tools used in semiconductor industry are highly costly, the plasmonic roller system using a regular UV light source is especially suitable for large-area cost-effective applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for plasmonic lithography comprising:
    passing electromagnetic radiation having a predetermined wavelength into a plasmonic device that comprises a photomask having a plurality of openings with an index matching layer disposed in the plurality of the openings and an optical epsilon-near-zero (ENZ) metamaterial structure having an effective in-plane permittivity of approximately 0, a multilayered stack that comprises at least one metal layer and at least one dielectric material layer, wherein the electromagnetic radiation generates a single plasmonic mode inside the optical epsilon-near-zero (ENZ) metamaterial structure and then passes to a photosensitive material disposed beneath the plasmonic device to form a pattern comprising a nanofeature in the photosensitive material, wherein the nanofeature has at least dimension that is less than 1/3 of the predetermined wavelength; and the photosensitive material is disposed between the optical epsilon-near-zero (ENZ) metamaterial structure and the multilayered stack, wherein the photomask is disposed adjacent to a first side of the optical epsilon-near-zero (ENZ) metamaterial structure and the photosensitive material is disposed adjacent to a second side of the optical epsilon-near-zero (ENZ) metamaterial structure opposite to the first side.

2. The method of claim 1, wherein the plasmonic device is in the form of a roller and the optical epsilon-near-zero (ENZ) metamaterial structure is wrapped around a cylindrical component that transmits the electromagnetic radiation having the predetermined wavelength, wherein the passing occurs continuously to form the pattern.

3. The method of claim 2, wherein the roller contacts the photosensitive material during the passing.

4. The method of claim 1, wherein the nanofeature has at least one dimension that is less than 1/6 of the predetermined wavelength.

5. The method of claim 1, wherein an average field intensity of light that reaches the photosensitive material is greater than or equal to about one half of the incident light.

6. The method of claim 1, wherein the nanofeature has an aspect ratio of greater than or equal to about 2:1.

7. The method of claim 1, wherein the pattern comprises a plurality of nanofeatures and the plurality of nanofeatures formed is substantially uniform so that a first dimension of a first nanofeature deviates less than 30% from a second dimension of a second nanofeature.

8. The method of claim 1, wherein the predetermined wavelength is greater than or equal to about 10 nm to less than or equal to about 750 nm.

9. The method of claim 1, wherein the optical epsilon-near-zero (ENZ) metamaterial structure is an epsilon-near-zero (ENZ) hyperbolic metamaterial (HMM), wherein the epsilon-near-zero (ENZ) hyperbolic metamaterial (HMM) is a Type II epsilon-near-zero (ENZ) hyperbolic metamaterial (HMM) that generates the single plasmonic mode.

10. The method of claim 1, wherein the epsilon-near-zero (ENZ) hyperbolic metamaterial (HMM) comprises a stack comprising at least one metal layer and at least one dielectric layer.

11. The method of claim 10, wherein the at least one metal layer comprises a metal selected from the group consisting of: aluminum (Al), gold (Au), copper (Cu), silver (Ag), combinations and alloys thereof and the at least one dielectric layer comprises a dielectric material selected from the group consisting of: aluminum oxide ($Al_2O_3$), silicon dioxide ($SiO_2$), silicon nitride ($Si_3N_4$), zinc selenide (ZnSe), zinc oxide (ZnO), zirconium oxide ($ZrO_2$), titanium oxide ($TiO_2$), tantalum pentoxide ($Ta_2O_5$) dielectric polymers, and combinations thereof.

12. A plasmonic device for lithography comprising:
an optical epsilon-near-zero (ENZ) metamaterial structure having an effective in-plane permittivity of approximately 0;
a photomask having a grating structure comprising a plurality of metallic rows spaced apart from one another to define a plurality of openings through which electromagnetic radiation passes;
an index matching layer disposed in the plurality of openings of the photomask;
a multilayered stack that comprises at least one metal layer and at least one dielectric material layer; and
a photosensitive material to be patterned by the electromagnetic radiation that is disposed between the optical epsilon-near-zero (ENZ) metamaterial structure and the multilayered stack, wherein the photomask is disposed adjacent to a first side of the optical epsilon-near-zero (ENZ) metamaterial structure and the photosensitive material is disposed adjacent to a second side of the optical epsilon-near-zero (ENZ) metamaterial structure opposite to the first side.

13. The plasmonic device of claim 12, where a period of the photomask is greater than or equal to about 695 nm to less than or equal to about 702 nm.

14. The plasmonic device of claim 12, wherein the optical epsilon-near-zero (ENZ) metamaterial structure comprises a stack comprising at least one metal layer having a thickness of less than or equal to about 15 nm and at least one dielectric layer, wherein the at least one metal layer consists essentially of aluminum (Al) or an alloy of aluminum (Al) and a metal selected from the group consisting of: gold (Au), copper (Cu), silver (Ag), and combinations.

15. The plasmonic device of claim 12, wherein the at least one metal layer in the stack of the optical epsilon-near-zero (ENZ) metamaterial structure consists essentially of aluminum (Al) or an alloy of aluminum (Al) and silver (Ag).

* * * * *